United States Patent
Frey et al.

(10) Patent No.: US 7,484,058 B2
(45) Date of Patent: *Jan. 27, 2009

(54) REACTIVE DEADLOCK MANAGEMENT IN STORAGE AREA NETWORKS

(75) Inventors: Robert Tower Frey, Milpitas, CA (US); Chao Zhang, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 594 days.

This patent is subject to a terminal disclaimer.

(21) Appl. No.: 10/833,457

(22) Filed: Apr. 28, 2004

(65) Prior Publication Data

US 2005/0246504 A1 Nov. 3, 2005

(51) Int. Cl.
*G06F 12/16* (2006.01)
*G06F 13/14* (2006.01)
(52) U.S. Cl. .................. 711/162; 711/167; 711/203; 714/16
(58) Field of Classification Search .................. None
See application file for complete search history.

(56) References Cited

U.S. PATENT DOCUMENTS

| | | | | |
|---|---|---|---|---|
| 5,588,012 A | * | 12/1996 | Oizumi | 714/805 |
| 5,666,559 A | * | 9/1997 | Wisor et al. | 710/32 |
| 6,880,040 B2 | * | 4/2005 | Basham et al. | 711/111 |
| 7,013,336 B1 | * | 3/2006 | King | 709/224 |
| 7,024,523 B1 | * | 4/2006 | Young | 711/154 |
| 2002/0156984 A1 | * | 10/2002 | Padovano | 711/148 |
| 2005/0076113 A1 | * | 4/2005 | Klotz et al. | 709/224 |

* cited by examiner

*Primary Examiner*—Gary J Portka
(74) *Attorney, Agent, or Firm*—Barry N. Young

(57) ABSTRACT

Systems and methods in accordance with various embodiments can detect and alleviate potential or actual deadlock of a storage switch or storage area network when attempting to write data to a mirrored virtual target. In accordance with one embodiment, a timer is started when a storage switch routes a write command to the physical targets corresponding to a virtual target of the write command. If each physical target does not return a transfer ready resource within a predetermined timeout period, the switch determines that a potential or actual deadlock has occurred. An abort command is sent to each of the physical devices. The abort command can clear the command from the targets and also free any allocated transfer ready resources. After receiving an acceptance response from each physical target, the state of the write command at the switch can be cleared. The write command can then be re-issued to the physical devices. In one embodiment, a queue depth for the virtual target can be lowered after failing to receive transfer ready resources from each target. By decreasing the queue depth, the maximum number of commands the switch will process for a virtual target is decreased to decrease the probability of future deadlock. In one embodiment, the queue depth is increased after no deadlock is detected for a period of time.

41 Claims, 17 Drawing Sheets

(Virtualization Ingress - cmd)

(Virtualization - Egress - cmd)

(Virtualization - Ingress - R2T/XFR_RDY)

(Virtualization - Egress - R2T/XFR_RDY)

(Virtualization - Ingress - write data packet)

(Virtualization - Egress - write data pkt)

REACTIVE DEADLOCK MANAGEMENT IN STORAGE AREA NETWORKS

CROSS-REFERENCE TO RELATED APPLICATIONS

The following applications are cross-referenced and incorporated by reference herein in their entirety:

U.S. patent application Ser. No. 10/833,438, entitled PROACTIVE TRANSFER READY RESOURCE MANAGEMENT IN STORAGE AREA NETWORKS, filed Apr. 28, 2004;

U.S. patent application Ser. No. 10/051,321, entitled STORAGE SWITCH FOR STORAGE AREA NETWORK, filed Jan. 18, 2002;

U.S. patent application Ser. No. 10/051,415, entitled PROTOCOL TRANSLATION IN A STORAGE SYSTEM, filed Jan. 18, 2002;

U.S. patent application Ser. No. 10/051,164, entitled SERVERLESS STORAGE DEVICES, filed Jan. 18, 2002, now U.S. Pat. No. 7,185,062, issued Feb. 27, 2007;

U.S. patent application Ser. No. 10/051,093, entitled PACKET CLASSIFICATION IN A STORAGE SYSTEM, filed Jan. 18, 2002;

U.S. patent application Ser. No. 10/051,396, entitled VIRTUALIZATION IN A STORAGE SYSTEM, filed Jan. 18, 2002;

U.S. patent application Ser. No. 10/051,339, entitled ENFORCING QUALITY OF SERVICE IN A STORAGE NETWORK, filed Jan. 18, 2002;

U.S. patent application Ser. No. 10/050,974, entitled POOLING AND PROVISIONING STORAGE RESOURCES IN A STORAGE NETWORK, filed Jan. 18, 2002, now U.S. Pat. No. 6,976,134, issued Dec. 13. 2005; and U.S. patent application Ser. No. 10/051,053, entitled LOAD BALANCING IN A STORAGE NETWORK, filed Jan. 18, 2002.

BACKGROUND OF THE INVENTION

1. Field of the Invention

The present invention relates generally to storage area networks.

2. Description of the Related Art

The management of information is becoming an increasingly daunting task in today's environment of data intensive industries and applications. More particularly, the management of raw data storage is becoming more cumbersome and difficult as more companies and individuals are faced with larger and larger amounts of data that must be effectively, efficiently, and reliably maintained. Entities continue to face the necessity of adding more storage, servicing more users, and providing access to more data for larger numbers of users.

The concept of storage area networks or SAN's has gained popularity in recent years to meet these increasing demands. Although various definitions of a SAN exist, a SAN can generally be considered a network whose primary purpose is the transfer of data between computer systems and storage elements and among storage elements. A SAN can form an essentially independent network that does not have the same bandwidth limitations as many of its direct-connect counterparts including storage devices connected directly to servers (e.g., with a SCSI connection) and storage devices added directly to a local area network (LAN) using traditional Ethernet interfaces, for example.

In a SAN environment, targets, which can include storage devices (e.g., tape drives and RAID arrays) and other devices capable of storing data, and initiators, which can included servers, personal computing devices, and other devices capable of providing write commands and requests, are generally interconnected via various switches and/or appliances. The connections to the switches and appliances are usually Fibre Channel. This structure generally allows for any initiator on the SAN to communicate with any target and vice versa. It also provides alternative paths from initiator to target. In other words, if a particular initiator is slow or completely unavailable, another initiator on the SAN can provide access to the target. A SAN also makes it possible to mirror data, making multiple copies available and thus creating more reliability in the availability of data. When more storage is needed, additional storage devices can be added to the SAN without the need to be connected to a specific initiator, rather, the new devices can simply be added to the storage network and can be accessed from any point.

Some SAN's utilize appliances to perform storage management for the SAN. A typical appliance may receive and store data within the appliance, then, with an internal processor for example, analyze and operate on the data in order to forward the data to the appropriate target(s). Such store-and-forward processing can slow down data access, including the times for reading data from and writing data to the storage device(s).

While appliances can perform switching operations, switches are often used to connect initiators with appliances, given the large number of initiators and small number of ports included in many appliances. In more current SAN implementations, switches have replaced certain functionality previously preformed by appliances such that appliances are not necessary and can be eliminated from the systems.

SANs, typically through switches and/or appliances, perform virtualization functions to allocate space of one or more physical targets to a particular user with the physical space remaining unknown to the user. For example, a company may utilize a SAN to provide data storage that employees access for data storage and retrieval. A engineering department, for example, may have storage allocated as "engineering storage space." The employees may see and interact with the virtual space as they would see or interact with a physical storage device such as an attached hard disk drive. Nevertheless, the space may actually be divided over multiple physical storage devices and even be fragmented within single storage devices. A switch or appliance can receive a request for a virtual space and block number(s) and determine the device(s) and portions thereof that physically correlate to the virtual space requested in order to direct the data accordingly.

More recent storage area network switches are capable of routing data between initiators and targets without buffering the data as required by earlier appliances used in SAN's. For example, some storage switches can route data packets without introducing more latency to the packets than would be introduced by a typical network switch. Such unbuffered data transfer between initiators and targets must be handled reliably and efficiently by the switch performing the interconnection. An example of a storage switch can be found in co-pending U.S. patent application Ser. No. 10/051,396, entitled VIRTUALIZATION IN A STORAGE SYSTEM, filed Jan. 18, 2002.

For example, an important feature of SANs is the ability to reliably and efficiently store data in multiple targets or within multiple logical units of one or more targets through so called mirroring or use of a mirrored virtual target. Some networks may include a storage area (or virtual target) that maintains multiple copies of data in one or more physical locations for increased reliability of data storage. Accordingly, a switch in such a network may route data to two storage devices, for example, in response to a request to write data to the storage area. Typically, physical targets are only able to handle a limited number of transfer requests at a given time. When routing data to be mirrored using a buffered approach, data packets may be maintained in the connecting device until each target is able to receive the data. If the data is to be written to two physical devices for example, data may be written to the first device at a first time when the first device is available and to a second device at a second time when the second device is available. Accordingly, in a buffered implementation, a switch can receive a write command for a virtual target and simply route it to the appropriate physical device(s) without first determining the availability of a transfer ready resource. Since the data is buffered in the switch, it can be routed to the individual physical devices as they return a transfer ready signal.

Unbuffered data transfer between servers and targets, however, can present further obstacles to the switches routing such data. If not properly managed, a network or portion thereof can become deadlocked while attempting to write the data. In an unbuffered approach, data packets are not maintained or buffered at the connecting device when routing data in operations such as mirroring operations. Accordingly, each target for which data is destined must be available to receive the data before the data is requested or sent from the initiating device. For example, a connecting device may wait to receive transfer ready signals from each target before issuing a transfer ready signal to the initiating device. Because of each target's limited ability to issue transfer ready signals, the switch and targets can become deadlocked waiting for either transfer ready resources or data packets.

For example, a switch may issue a first write command (e.g., write A) to a first and second target and a second write command (e.g., write B) to the same first and second target. If each target only includes a single transfer ready resource, and the first target issues its only available transfer ready signal in response to the write A command while the second target issues its only available transfer ready signal in response to the write B command, the switch and targets can become deadlocked. The first target can only issue a transfer ready signal for the write B command after receiving data for the write A command (since its only resource is allocated to the write A command). The second target can only issue a transfer ready signal for the write A command after receiving data for the write B command. Each target, however, will not receive data in response to its issued transfer ready signal and thus, will not issue a transfer ready signal for the remaining command.

The switch can not provide a transfer ready signal to the initiator for the write A command until it receives a transfer ready signal for the write A command from the second target. Additionally, the switch can not provide a transfer ready signal for the write B command to the initiator until it receives a transfer ready signal for the write B command. Thus, the initiator won't provide data for the write A or write B command to the switch and no data will be routed to the targets. Thus, the switch and targets will become deadlocked. Each target will wait for data packets in response to its issued transfer ready signal and the switch will wait for a transfer ready signal from each target.

Accordingly, a system and method for managing the limited transfer ready resources of physical targets is needed.

SUMMARY OF THE INVENTION

In accordance with various embodiments, systems and methods are provided to detect and alleviate potential or actual deadlock encountered in a storage area network when attempting to write data to a mirrored virtual target.

In accordance with one embodiment, a write command for a mirrored virtual target can be received from an initiator and routed to one or more physical targets corresponding to the mirrored virtual target. A timer can be started (or timeout period begin) when the write command is routed to the various physical targets. If a transfer ready signal is received from each of the virtual targets within a predetermined period of time, a transfer ready signal can be provided to the initiator. The initiator will then provide one or more data packets that can be routed to the physical targets.

If a transfer ready signal is not received from each physical device before expiration of the timer or end of the timeout period, an abort command can be issued to each of the physical targets to clear the write command and allocated transfer ready resources at the physical targets. When an acceptance response is received from each physical target, the state of the write command can be cleared to indicate that it has not been executed. The storage switch can then re-issue the write command to the physical targets and determine if each target returns a transfer ready signal.

In accordance with one embodiment, a queue depth (maximum count of requests that will be processed for a virtual target) can be lowered if a deadlock is detected. For example, if transfer ready signals are not received from each physical target corresponding to a virtual target, the queue depth for the virtual target can be lowered to a value of one. By lowering the queue depth, the maximum number of requests the switch will process for the virtual target is lowered and the likelihood that a future deadlock situation will be encountered when writing to that virtual target is decreased. In one embodiment, the queue depth is increased after it has been lowered in response to deadlock detection. For example, after a period of time in which no deadlock is detected, the queue depth can be gradually increased, such as by incrementally raising the queue depth at regular time intervals.

In one embodiment, a method of writing data to a mirrored virtual target is provided, wherein the method includes receiving a write command for a virtual target having at least a first and a second corresponding physical target, providing the write command to the first physical target and the second physical target, determining whether a first transfer ready signal is returned by the first physical target and a second transfer ready signal is returned by the second physical target within a timeout period, and providing an abort command to the first physical target and the second physical target if the first transfer ready signal and the second transfer ready signal are not returned within the timeout period.

In another embodiment, a storage switch is provided that includes at least one port adapted to receive a write command, wherein the write command is for a virtual target having at least a first and second corresponding physical target, and wherein the at least one port is further adapted to provide the write command to the first and second physical target. The storage switch further includes at least one processing unit in communication with the at least one port. The at least one processing unit provides an abort command to the first physical target and the second physical target if, within a timeout period after the write command is provided to the first physical target and the second physical target, a first transfer ready signal is not received from the first physical target and a second transfer ready signal is not received from the second physical target.

Other features, aspects, and objects of the invention can be obtained from a review of the specification, the figures, and the claims.

DETAILED DESCRIPTION

Figure 1:
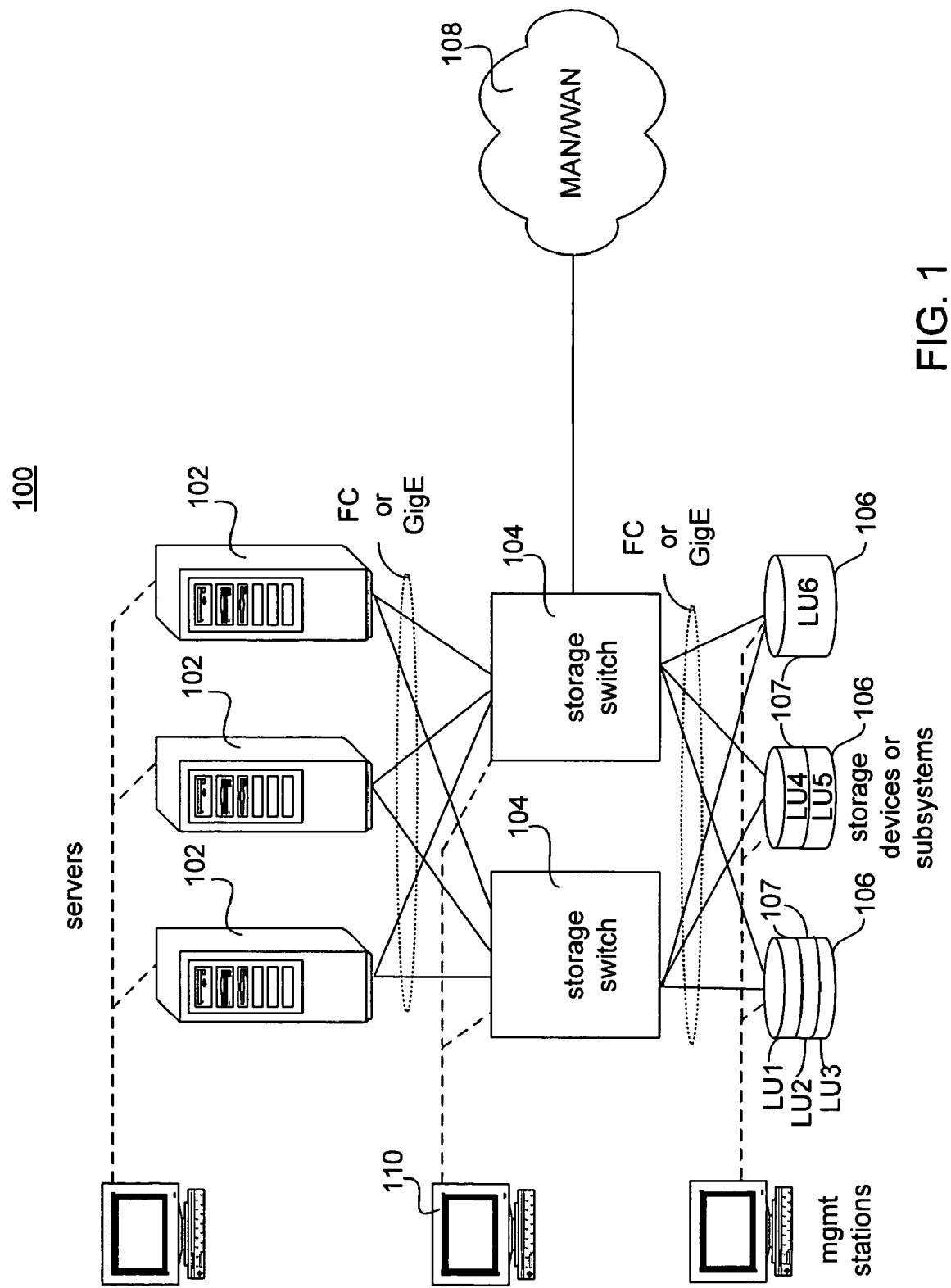
FIG. 1 is a generalized functional block diagram of a storage switch in accordance with one embodiment.

An exemplary system 100 including a storage switch in accordance with one embodiment is illustrated in FIG. 1. System 100 can include a plurality of initiating devices such as servers 102. It will be appreciated that more or fewer servers can be used and that embodiments can include any suitable physical initiator in addition to or in place of servers 102. Although not shown, the servers could also be coupled to a LAN. As shown, each server 102 is connected to a storage switch 104. In other embodiments, however, each server 102 may be connected to fewer than all of the storage switches 104 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined by Intel Inc., or other protocols or connections.

In some embodiments, one or more switches 104 are each coupled to a Metropolitan Area Network (MAN) or Wide Area Network (WAN) 108, such as the Internet. The connection formed between a storage switch 104 and a WAN 108 will generally use the Internet Protocol (IP) in most embodiments. Although shown as directly connected to MAN/WAN 108, other embodiments may utilize a router (not shown) as an intermediary between switch 104 and MAN/WAN 108.

In addition, respective management stations 110 are connected to each storage switch 104, to each server 102, and to each storage device 106. Although management stations are illustrated as distinct computers, it is to be understood that the software to manage each type of device could collectively be on a single computer.

Such a storage switch 104, in addition to its switching function, can provide virtualization and storage services (e.g., mirroring). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 104 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks, including a network as illustrated in FIG. 1 can be found in U.S. patent application Ser. No. 10/051,396, entitled VIRTUALIZATION IN A STORAGE SYSTEM, filed Jan. 18, 2002 and U.S. patent application Ser. No. 10/051,321, entitled STORAGE SWITCH FOR STORAGE AREA NETWORK, filed Jan. 18, 2002.

"Virtualization" generally refers to the mapping of a virtual target space subscribed to by a user to a space on one or more physical storage target devices. The terms "virtual" and "virtual target" come from the fact that storage space allocated per subscription can be anywhere on one or more physical storage target devices connecting to a storage switch 104. The physical space can be provisioned as a "virtual target" which may include one or more "logical units" (LUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 2B:
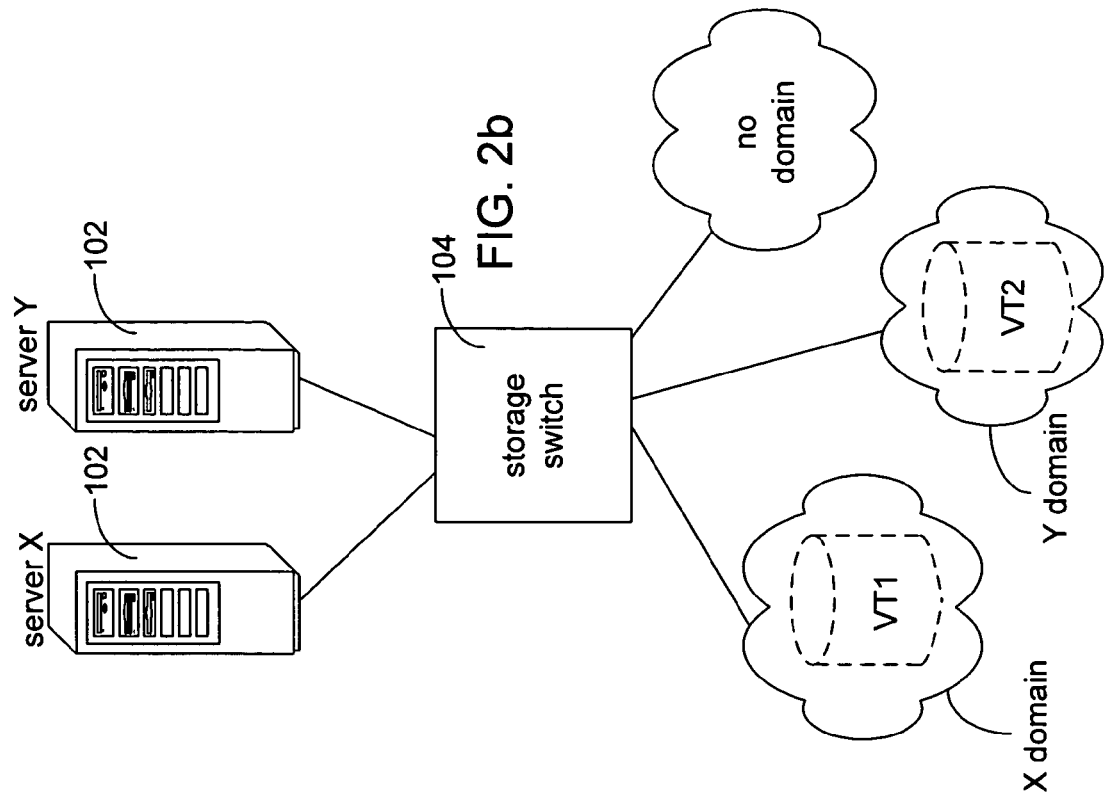
FIGS. 2a-2c are generalized functional block diagrams of a storage area network illustrating an exemplary provisioning of virtual targets.
Figure 2A:
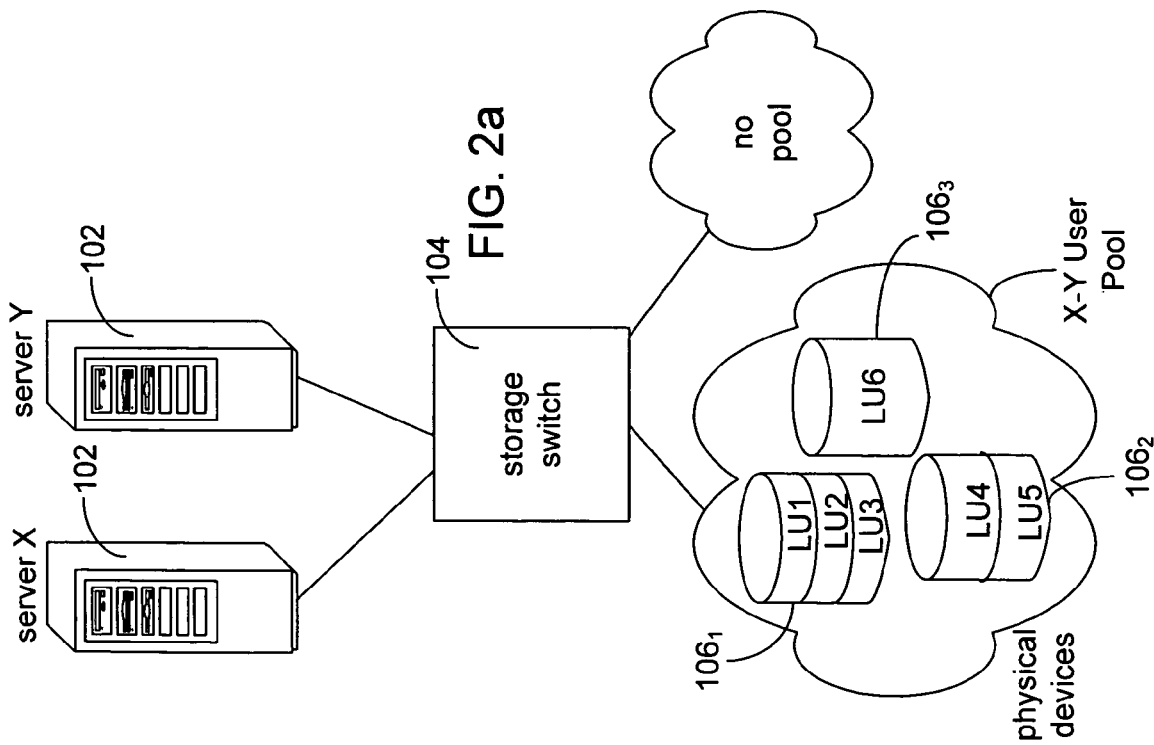
Figure 2C:
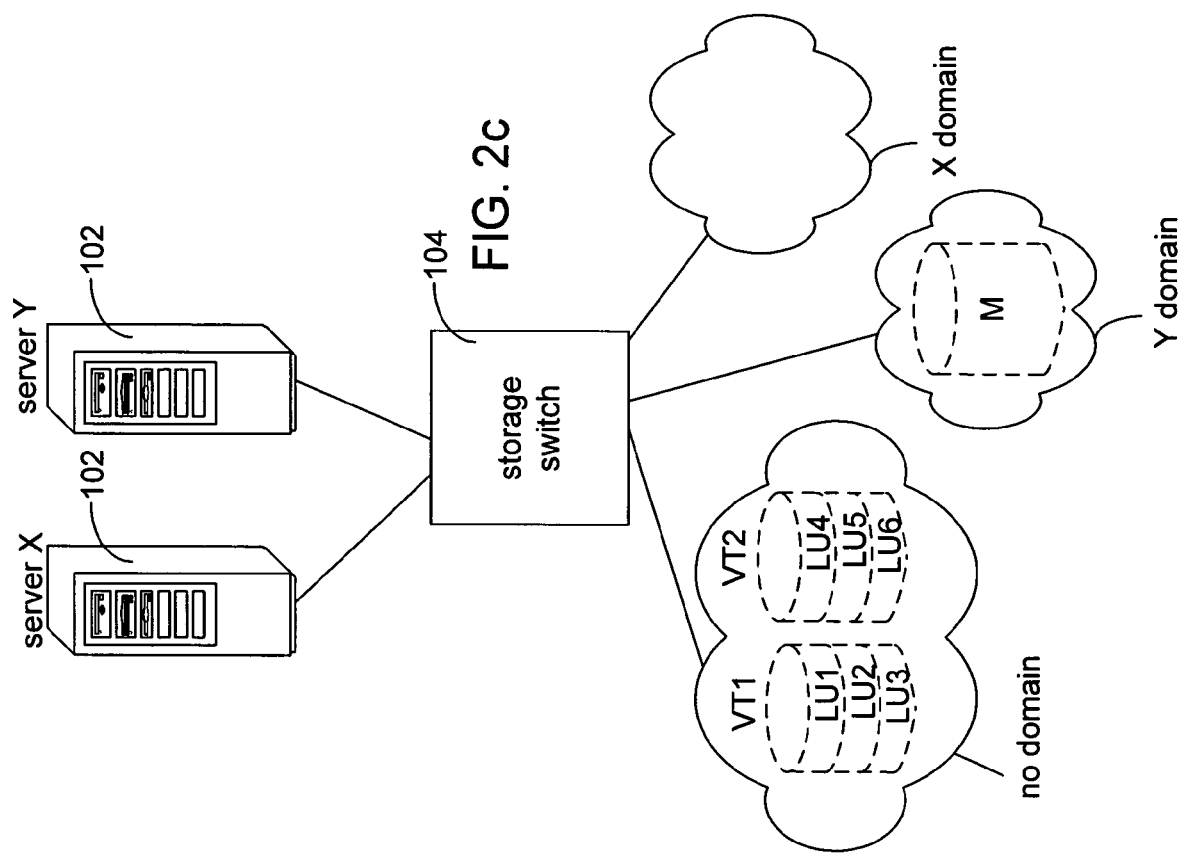

FIGS. 2a-2c illustrate one example of provisioning virtual targets in a storage area network. The system of FIG. 2 includes three physical devices $106_1$, $106_2$, and $106_3$, having a total of 6 LUs—LU1, LU2, LU3, LU4, LU5, LU6. In FIG. 2a, each physical device is coupled to a switch and placed in a pool accessible to two initiators X and Y, the "X-Y User Pool."

If initiator X and initiator Y each require one virtual target, then in one embodiment, the LUs are provisioned to form virtual targets VT1 and VT2, where VT1 includes as extents LUs 1-3 and VT2 includes as extents LUs 4-6 as depicted in FIG. 2b. VT1 is placed in the server X user domain and VT2 is placed in the server Y user domain. Initiator X will have access to VT1 but no VT2, while initiator Y will have access to VT2 but not VT1.

If instead, for example, initiator Y requires a mirrored virtual target M with a total of 6 LUs, VT1 and VT2 can be created as members of the virtual target M. VT1 and VT2 can be placed in the switch's No Domain (a domain where the physical targets are not directly accessible to users) while M is made accessible to Y, as shown in FIG. 2c. As members of M, VT1 and VT2 will not be independently accessible. VT1 is comprised of a LUs 1-3 (physical device $106_1$), while VT2 is comprised of LUs 4-6 (physical devices $106_2$ and $106_3$). When a request is received to write data to the virtual target M, switch 104 will route the incoming data to both VT1 (physical device $106_1$) and VT2 (physical device $106_2$ and/or $106_3$), thus storing the data in at least two physical locations.

Figure 3:
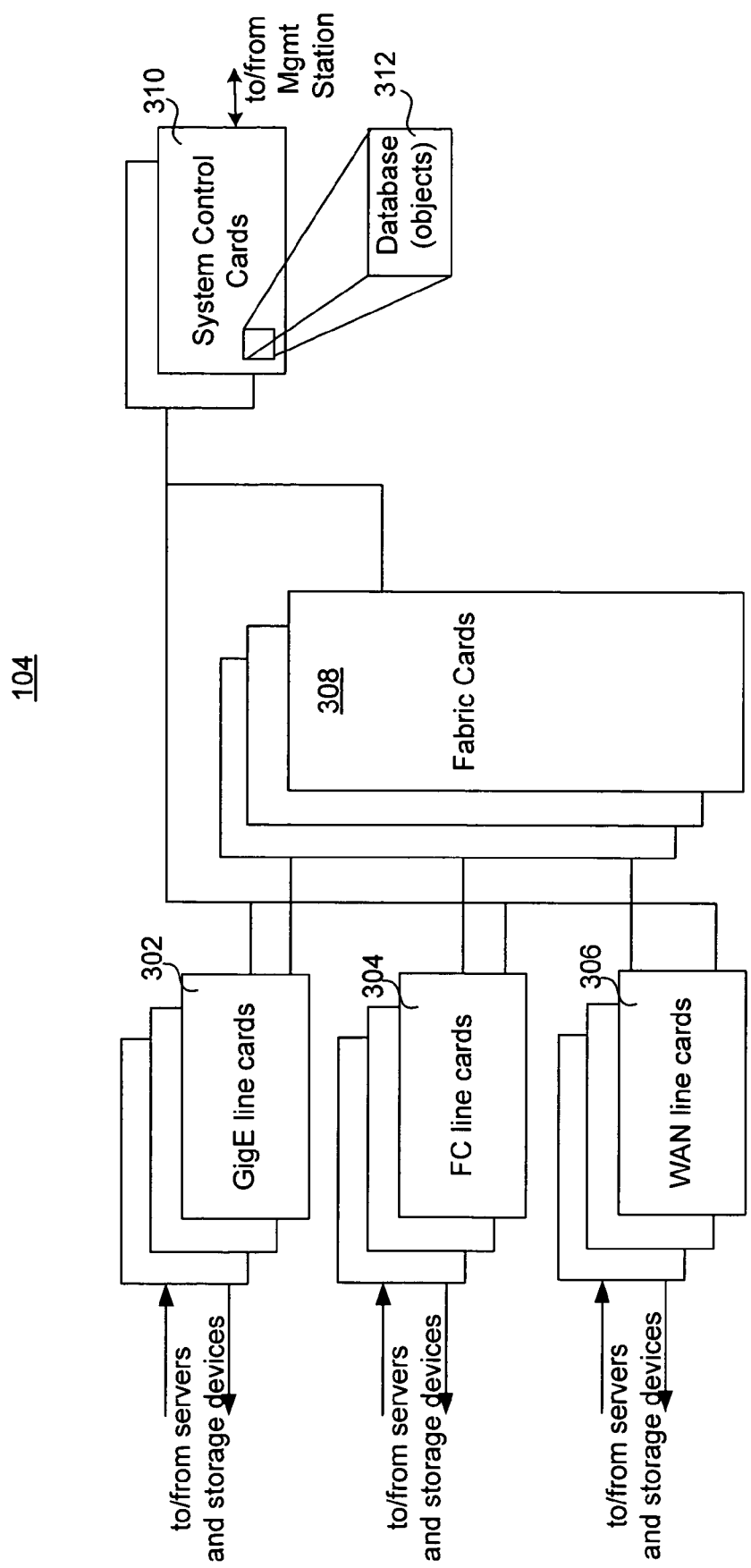
FIG. 3 is a generalized functional block diagram of a storage switch in accordance with one embodiment.

FIG. 3 illustrates a functional block diagram of a storage switch 104 in accordance with an embodiment of the invention. More information regarding the details of a storage switch such as storage switch 104 and its operation can be found in U.S. patent application Ser. No. 10/051,321, entitled STORAGE SWITCH FOR STORAGE AREA NETWORK, filed Jan. 18, 2002. In one embodiment, the storage switch 104 includes a plurality of linecards 302, 304, and 306, a plurality of fabric cards 308, and two system control cards 310, each of which will be described in further detail below. Although an exemplary storage switch is illustrated, it will be appreciated that numerous other implementations and configurations can be used in accordance with various embodiments.

System Control Cards. Each of the two System Control Cards (SCCs) 310 connects to every line card 302, 304, 306. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the ethernet connections, the SCC also initiates various storage services, e.g., snapshot and replicate.

In addition, the SCC maintains a database 312 that tracks configuration information for the storage switch as well as all virtual targets and physical devices attached to the switch, e.g., servers and storage devices. In addition, the database keeps information regarding usage, error and access data, as well as information regarding different domains and domain sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 104 can be reached by a management station 110 through the SCC 310 using an ethernet connection. Accordingly, the SCC also includes an additional Ethernet port for connection to a management station. An administrator at the management station can discover the addition or removal of storage devices or virtual targets, as well as query and update virtually any object stored in the SCC database 312.

Fabric Cards. In one embodiment of switch 104, there are three fabric cards 308, although other embodiments could have more or fewer fabric cards. Each fabric card 308 is coupled to each of the linecards 302, 304, 306 in one embodiment and serves to connect all of the linecards together. In one embodiment, the fabric cards 308 can each handle maximum traffic when all linecards are populated. Such traffic loads handled by each linecard are up to 160 Gbps in one embodiment although other embodiments could handle higher or lower maximum traffic volumes. If one fabric card 308 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 104 supports up to sixteen linecards although other embodiments could support a different number. Further, in one embodiment, three different types of linecards are utilized: Gigabit Ethernet (GigE) cards 302, Fibre Channel (FC) cards 304, and WAN cards 306. Other embodiments may include more or fewer types of linecards. The GigE cards 302 are for Ethernet connections, connecting in one embodiment to either iSCSI servers or iSCSI storage devices (or other Ethernet based devices). The FC cards 304 are for Fibre Channel connections, connecting to either Fibre Channel Protocol (FCP) servers or FCP storage devices. The WAN cards 306 are for connecting to a MAN or WAN.

Figure 4:
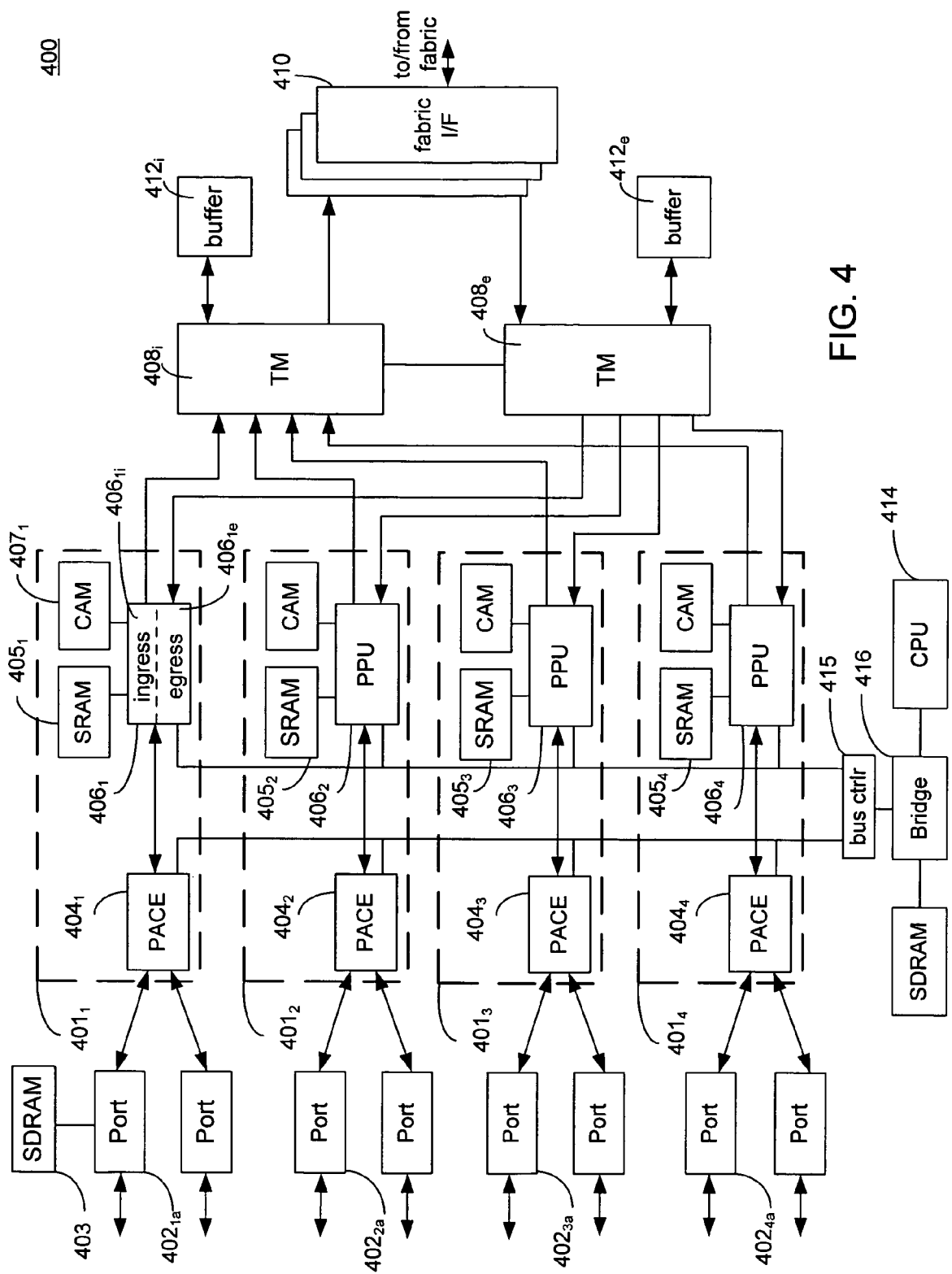
FIG. 4 is a generalized functional block diagram of a linecard used in a storage switch in accordance with one embodiment.

FIG. 4 illustrates a functional block diagram of a generic line card 400 used in a storage switch 104 in accordance with one embodiment. Line card 400 is presented for exemplary purposes only. Other line cards and designs can be used in accordance with embodiments. The illustration shows those components that are common among all types of linecards, e.g., GigE 302, FC 304, or WAN 306. In other embodiments other types of linecards can be utilized to connect to devices using other protocols, such as Infiniband.

Ports. Each line card 400 includes a plurality of ports 402. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 104. The ports of each linecard are full duplex in one embodiment, and connect to either a server or other client, and/or to a storage device or subsystem.

In addition, each port 402 has an associated memory 403. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 401. In one embodiment the SPU rapidly processes the data traffic allowing for wire-speed operations. In one embodiment, each SPU includes several elements: a Packet Aggregation and Classification Engine (PACE) 404, a Packet Processing Unit (PPU) 406, an SRAM 405, and a CAM 407. Still other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 404. As illustrated, the PACE 404 aggregates two ports into a single data channel having twice the bandwidth. For instance, the PACE 404 aggregates two 1 Gb ports into a single 2 Gb data channel. The PACE can classify each received packet into a control packet or a data packet. Control packets are sent to the CPU 414 for processing, via bridge 416. Data packets are sent to a Packet Processing Unit (PPU) 406, discussed below, with a local header added. In one embodiment the local header is sixteen bytes resulting in a data "cell" of 64 bytes (16 bytes of header and 48 bytes of payload). The local header is used to carry information and used internally by switch 104. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU 406₁, while all four PACEs in the illustrated embodiment share a path to the CPU 414, which in one embodiment is a 104 MHz/32 (3.2 Gbps) bit data path.

Packet Processing Unit (PPU). Each PPU such as PPU 406₁ performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU 406₁ᵢ and an egress PPU 406₁ₑ, which both run concurrently. The ingress PPU 406₁ᵢ receives incoming data from PACE 404₁ and sends data to the Traffic Manager 408ᵢ while the egress PPU 406₁ₑ receives data from Traffic Manager 408ₑ and sends data to a PACE 404₁. Although only one PPU 406₁ is shown in FIG. 4 as having an ingress PPU 406₁ᵢ and an egress PPU 406₁ₑ, it is to be understood that in one embodiment all PPUs 406 will include both an ingress and an egress PPU and that only one PPU is shown in FIG. 4 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 414 of the linecard 400 informs a PPU 406 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU 406₁ are connected to an SRAM 405₁ and CAM 407₁. SRAM 405₁ can store a VTD and PTD database. A listing of VTD Identifiers (VTD IDs), or addresses, as well as PTD Identifiers (PTD IDs), is also maintained in the PPU CAM 407₁ for quick accessing of the VTDs. The VTD IDs are indexed (mapped) using a TCP Control Block Index and a LUN. The PTD IDs are indexed using a VTD ID. In addition, for IP routing services, the CAM 407₁ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 407 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 408 on each linecard 400: one TM 408ᵢ for ingress traffic and one TM 408ₑ for egress traffic. The ingress TM receives cells from all four SPUs, in the form of 64-byte data cells, in one embodiment. In such an embodiment, each data cell has 16 bytes of local header and 48 bytes of payload. The header contains a FlowID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 410 in one embodiment. Other embodiments may operate at 125 Mhz or other speeds. The egress TM receives the data cells from the fabric cards and delivers them to the four SPUs.

Both ingress and egress TMs have a large buffer 412 to queue cells for delivery. Both buffers 412 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function, used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 410 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 410.

CPU. On every linecard there is a processor (CPU) 614, which in one embodiment is a PowerPC 750 Cxe. In one embodiment, CPU 414 connects to each PACE with a 3.2 Gb bus, via a bus controller 415 and a bridge 416. In addition, CPU 414 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 104 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 414 and the SCC 310 are involved. When a TCP packet is received, and after initial handshaking is performed, a TCP control block is created and stored in the GigE port memory 403. A VTD is also retrieved from an object of the SCC database and stored in the CPU SDRAM 405 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 405. The CPU creates the VTD by retrieving the VTD information stored in its SDRAM and originally obtained from the SCC database. A VTD ID is established in a list of VTD IDs in the SPU CAM 407 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 402 communicates with the PACE 404 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELS's to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb. As a 1 Gb port, two ports are connected to a single PACE as illustrated in FIG. 4; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

Switch-Based Storage Operations

One of ordinary skill in the art will have a general knowledge of the iSCSI and FC protocols. However, for more information on iSCSI refer to "draft-ietf-ips-iSCSI-09.txt," an Internet Draft and work in progress by the Internet Engineering Task Force (IETF), Nov. 19, 2001, incorporated by reference herein. For more information about Fibre Channel (FC) refer to "Information Systems—dpANS Fibre Channel Protocol for SCSI," Rev. 012, Dec. 4, 1995 (draft proposed American National Standard), incorporated by reference herein. In addition, both are further described in U.S. patent application Ser. No. 10/051,321, entitled STORAGE SWITCH FOR STORAGE AREA NETWORK, filed Jan. 18, 2002.

Virtualization

Exemplary ingress and egress processes for various packet types are described for explanatory purposes only. It will be understood that numerous processes for various packet types can be used in accordance with various embodiments. In one embodiment, after an incoming packet is classified as data or control traffic by the PPU, the PPU can perform virtualization for data packets without data buffering. For each packet received, the PPU determines the type of packet (e.g., command, R2T/XFER_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both.

Command Packet—Ingress

Figure 5:
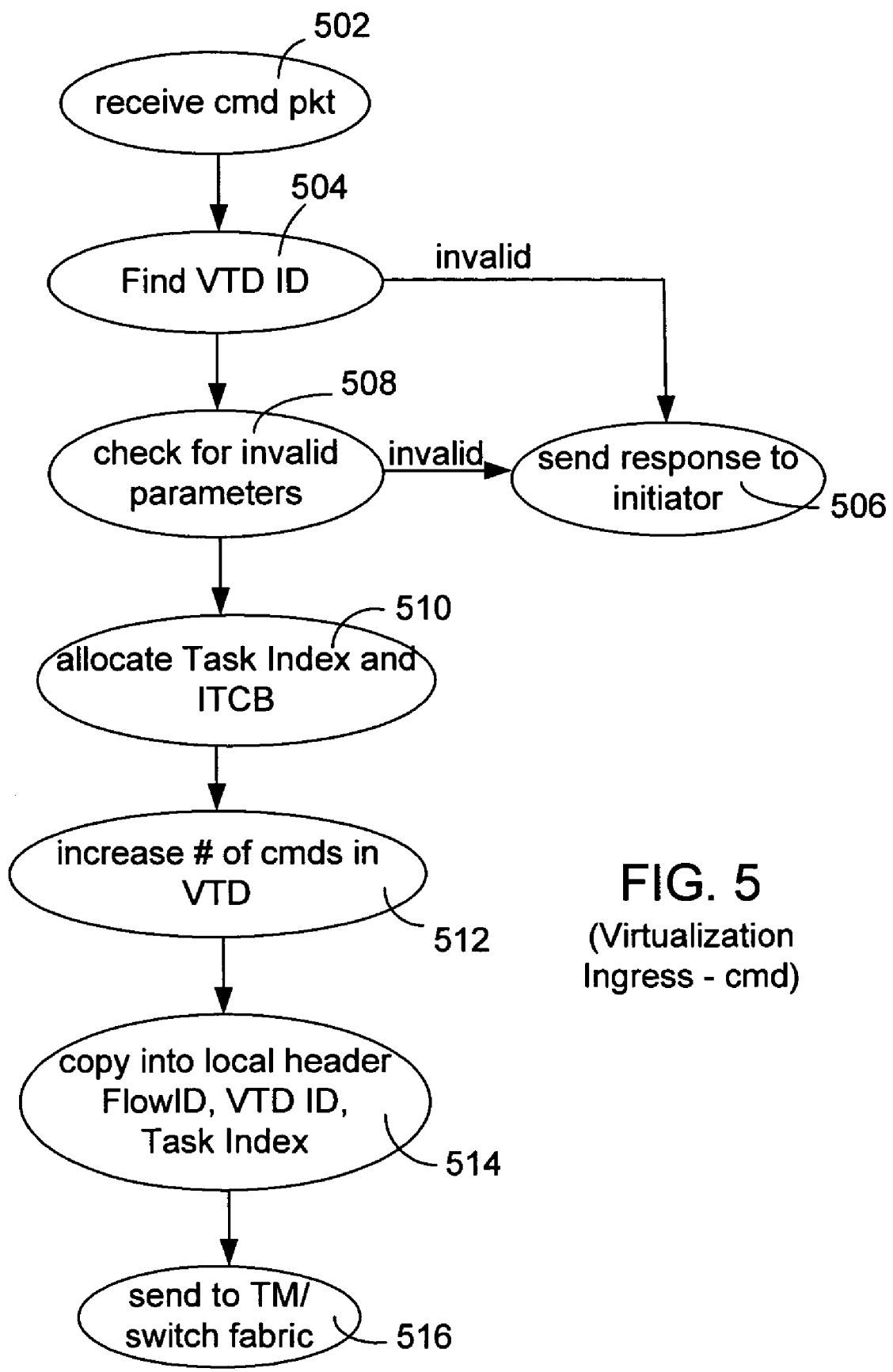
FIG. 5 is a is a flowchart illustrating a virtualization process in the ingress direction for command packets or frames, in accordance with one embodiment.

To initiate a transfer task to or from the virtual target, a SCSI command is sent by an iSCSI or FC initiator in an iSCSI PDU or FCP IU, respectively. Referring to FIG. 5, when such a packet is received at the PPU (after classification), step 502, the PPU CAM is next checked to determine if a valid VTD ID exists, using the TCP Control Block Index and the logical unit number (LUN), in the case of an iSCSI initiator, or the S_ID (an identification of the source of the frame) and the LUN, in the case of an FC initiator, step 504. The LUNs in each case are found in the respective iSCSI PDU or FCP IU. If no valid VTD ID is found, then a response packet is sent back to the initiator, step 506. If a valid VTD is found, then a check is made for invalid parameters, step 508. If invalid parameters exists, a response packet is sent back to the iSCSI or FC initiator, step 506.

A Task Index is allocated along with an Ingress Task Control Block (ITCB), step 510. The Task Index points to or identifies the ITCB. The ITCB stores the FlowID (obtained from the VTD), the VTD ID, command sequence number or CmdSN (from the iSCSI packet itself), as well as an initiator (originator) identification (e.g., the initiator_task_tag sent in the iSCSI PDU or the OX_ID in the FCP frame header). The OX_ID is the originator (initiator) identification of the exchange. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it increments the number of outstanding commands, step 512. In some embodiments, VTDs establish a maximum number of commands that may be outstanding to any one particular virtual target. The FlowID, the VTD ID, and the Task Index are all copied into the local header, step 514. The FlowID tells the traffic manager the destination linecards and ports. Later, the Task Index will be returned by the egress port to identify a particular task of a packet. Finally, the packet is sent to the traffic manager and then the routing fabric, so that it ultimately reaches an egress PPU, step 516.

When a virtual target is composed of multiple extents, there are multiple FlowIDs identified in the VTD, one for each extent. The PPU checks the block address for the packet and selects the correct FlowID. For example, if a virtual target has two 1 Gb extents, and the block address for the command is in the second extent, then the PPU selects the FlowID for the second extent. In other words, the FlowID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Command Packet—Egress

Figure 6:
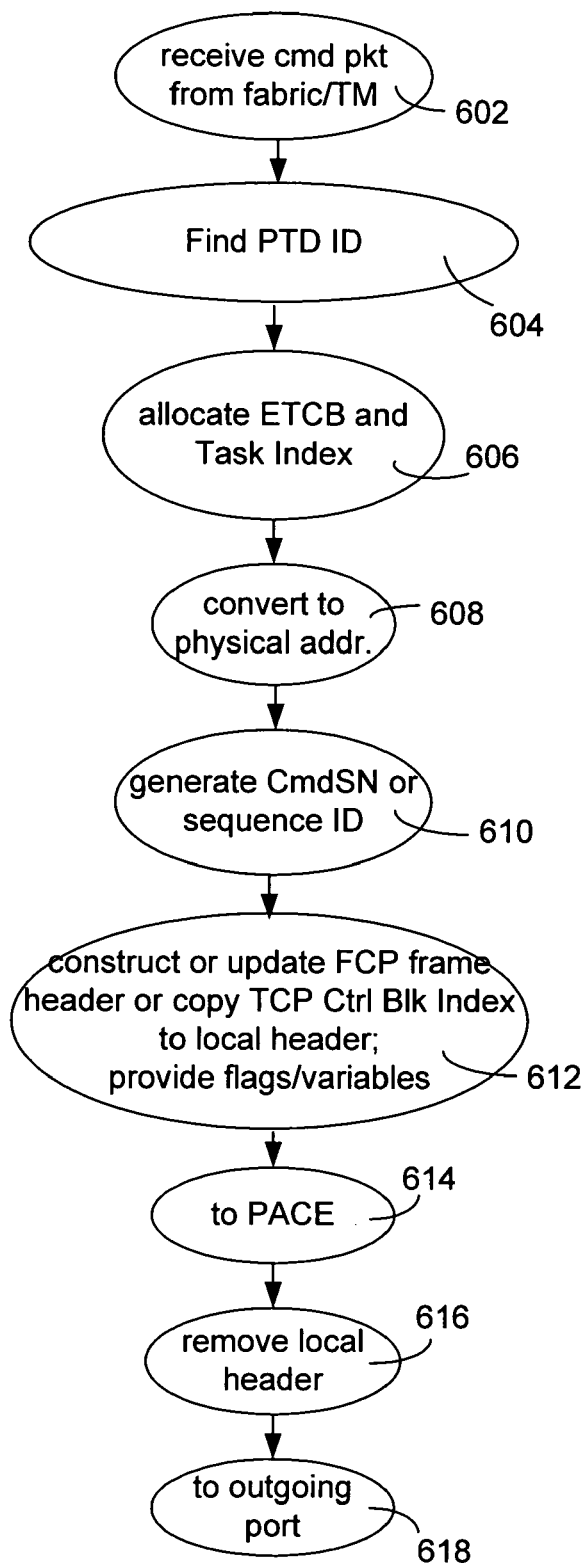
FIG. 6 is a flowchart illustrating a virtualization process in the egress direction for command packets or frames, in accordance with one embodiment.

Referring to FIG. 6, after a command PDU or IU has passed through the switch fabric, it will arrive at an PPU, destined for an egress port, step 602. The PPU attempts to identify the physical device(s) that the packet is destined for, step 604. To do so, the VTD ID from the local header is used to search the PPU CAM for a PTD ID (Physical Target Descriptor Identifier). The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the FlowID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 606. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Using the contents of the PTD, the PPU converts the SCSI block address from a virtual target to the block address of a physical device, step 608. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. Next the PPU generates proper iSCSI CmdSN or FCP sequence ID, step 610 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 612. In addition, the PPU provides any flags or other variables needed for the iSCSI or FCP headers. The completed iSCSI PDU or FCP frame are then sent to the PACE, step 614, which in turn strips the local header, step 616, and passes the packet to appropriate port, step 618.

R2T or XFER RDY_Ingress

Figure 7:
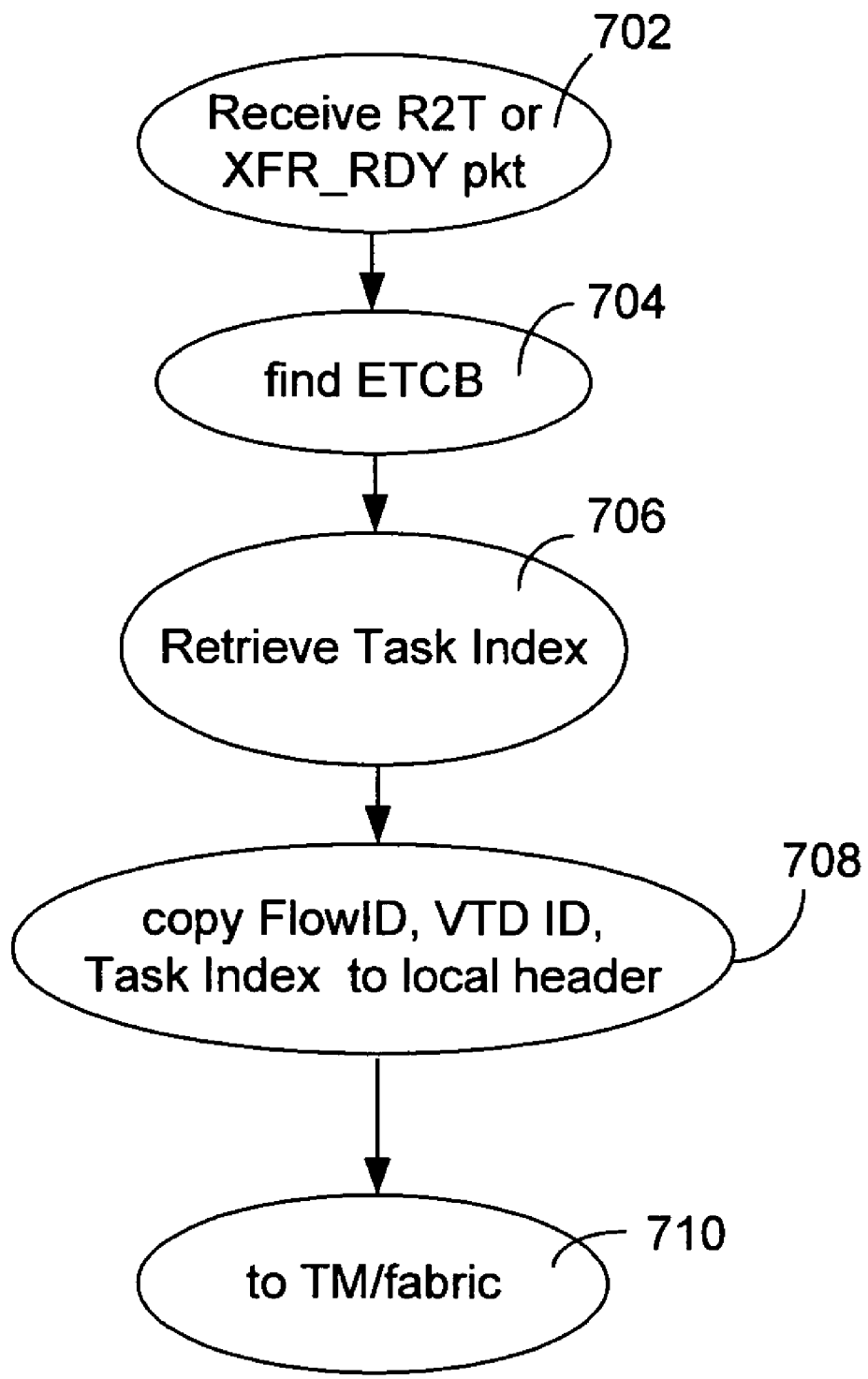
FIG. 7 is a flowchart illustrating a virtualization process in the ingress direction for R2T or XFR_RDY packets or frames, in accordance with one embodiment.
Figure 8:
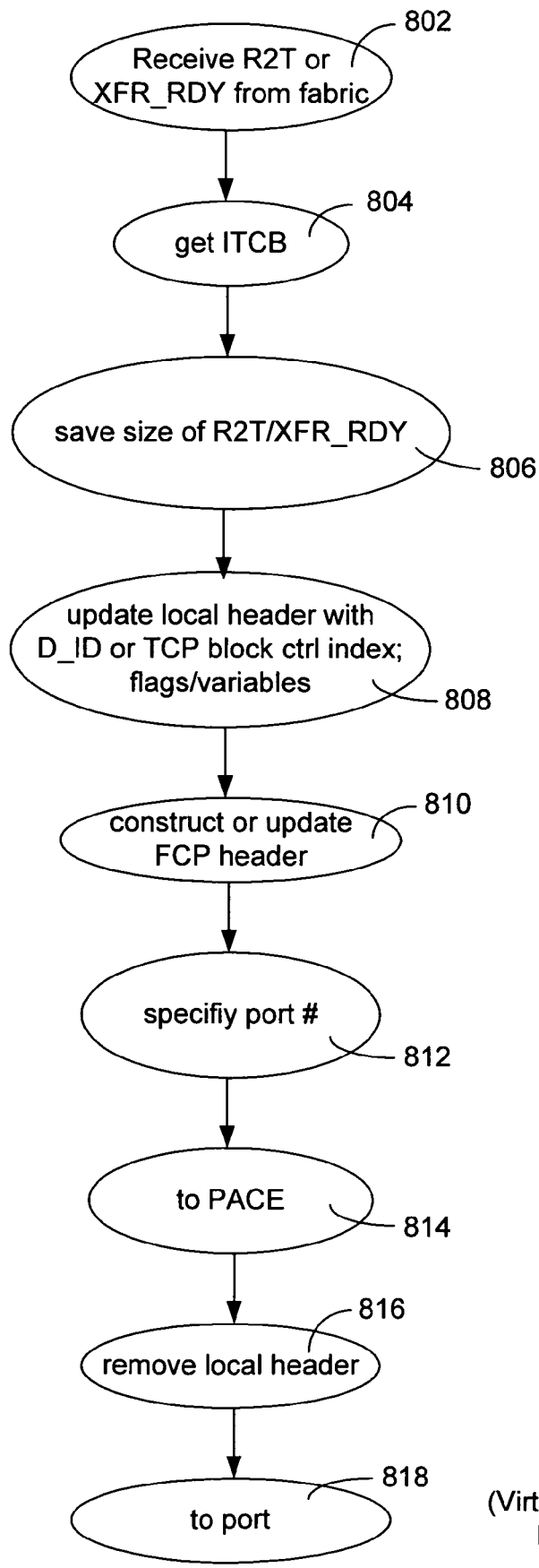
FIG. 8 is a flowchart illustrating a virtualization process in the egress direction for R2T or XFR_RDY packets or frames, in accordance with one embodiment.

Referring to FIG. 7, after a command has been sent to a target storage device as described above, and the command is a write command, an R2T PDU or an XFER_RDY IU will be received from a storage device when it is ready to accept write data, step 702. The PPU identifies the corresponding ETCB, step 704, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index) and the VTD ID from the ETCB, step 1061. The PPU also retrieves the FlowID from the PTD, which is also identified in the ETCB by the PTD ID. The FlowID indicates to the traffic manager the linecard of the original initiator (ingress) port. The FlowID, the VTD ID, and the Task Index are copied into the local header of the packet, step 1062. Finally the packet is sent to the traffic manager and the switch fabric, step 710.

R2T or XFER_RDY—Egress

After the R2T or XFER_RDY packet emerges from the switch fabric, it is received by a PPU, step 802, on its way to be passed back to the initiator (the device that initiated the original command for the particular task). The Task Index identifies the ITCB to the PPU, step 804, from which ITCB the original initiator_task_tag and the VTD ID can be obtained. The R2T/XFER_RDY Desired Data Transfer Length or BURST_LEN field is stored in the ITCB, step 806. The local header is updated with the FCP D_ID or the TCP Control Block Index for the TCP connection, step 808. Note that the stored S_ID from the original packet, which is stored in the ITCB, becomes the D_ID. If necessary, an FCP frame header is constructed or its fields are updated, step 810. The destination port number is specified in the local header in place of the FlowID, step 812, and placed along with the initiator_task_tag in the SCSI PDU or, for an FC connection, the RX_ID and OX_ID are placed in the FCP frame. The RX_ID field is the responder (target) identification of the exchange. The PPU also places any other flags or variables that need to be placed in the PDU or FCP headers. The packet is forwarded to the PACE, step 814, which identifies the outgoing port from the local header. The local header is then stripped, step 816 and forwarded to the proper port for transmission, step 818.

In the event that the command is split over two or more extents, e.g., the command starts in one extent and ends in another, then the PPU must hold the R2T or XFER_RDY of the second extent until the data transfer is complete to the first extent, thus ensuring a sequential data transfer from the initiator. In addition, the data offset of the R2T or XFER_RDY of the second extent will need to be modified by adding the amount of data transferred to the first extent.

Write Data Packet—Ingress

Figure 9:
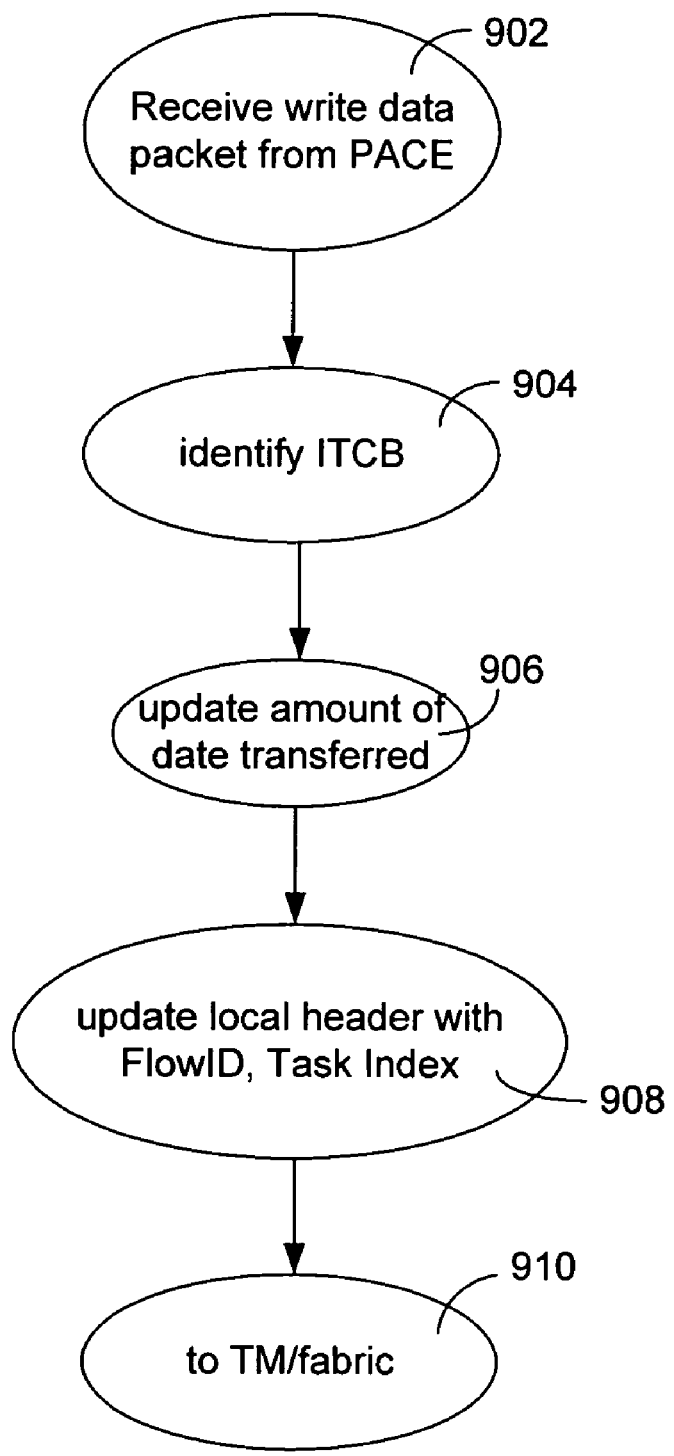
FIG. 9 is a flowchart illustrating a virtualization process in the ingress direction for write data packets or frames, in accordance with one embodiment.

After an initiator receives an R2T or XFER_RDY packet it returns a write-data packet. Referring to FIG. 9, when a write-data iSCSI PDU or FC IU is received from an initiator, step 902, the ITCB to which the packet belongs must be identified, step 904. Usually, the ITCB can be identified using the RX_ID or the target_task_tag, which is the same as the Task Index in some embodiments. The SPU further identifies that received packets are in order. In some circumstances, however, the initiator will transfer unsolicited data: data that is sent prior to receiving an R2T or XFER_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 906. The FlowID and Task Index are added to the local header of the packet, step 908. The packet is then forwarded to the traffic manager and ultimately to the switch fabric, step 910.

Write Data Packet—Egress

Figure 10:
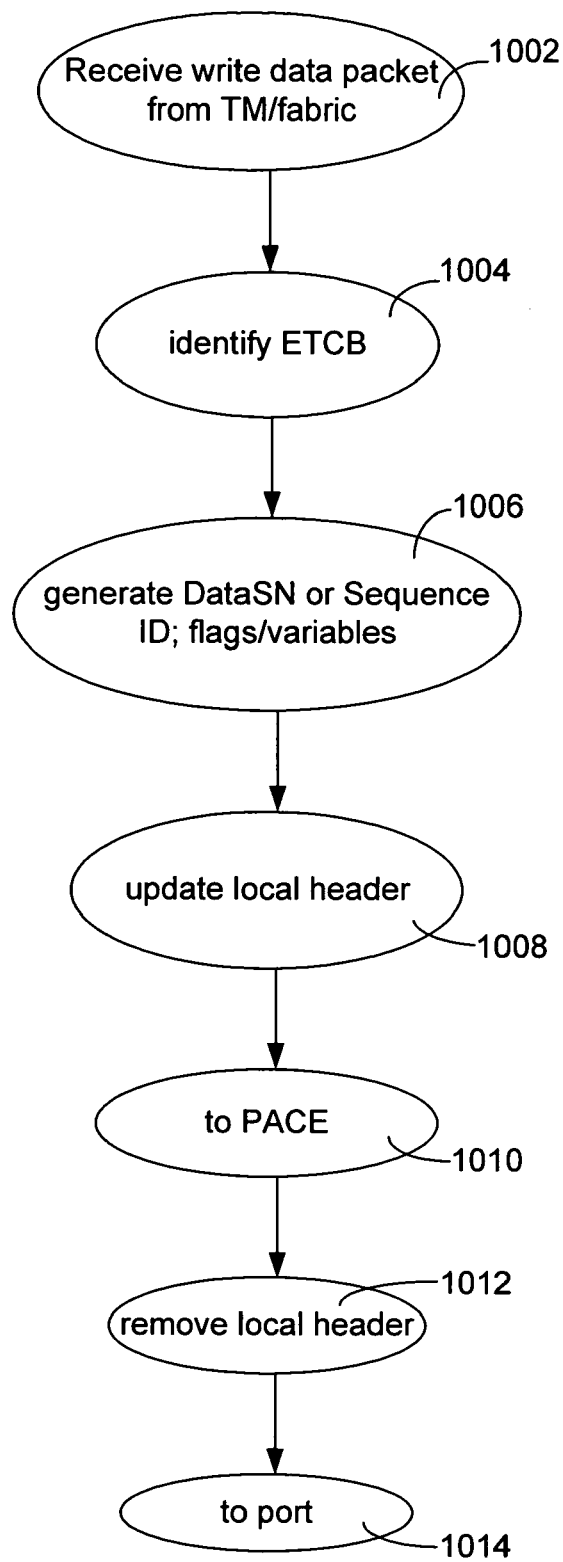
FIG. 10 is a flowchart illustrating a virtualization process in the egress direction for write data packets or frames, in accordance with one embodiment.

Referring to FIG. 10, when a write-data packet is received from the switch fabric (via the traffic manager), step 1002, the ETCB for the packet needs to be identified, step 1004. Typically, the ETCB can be identified using the Task Index in the local header. Once the ETCB is found, using the information inside the ETCB, the PPU generates proper iSCSI DataSN or FCP sequence ID, step 1006, along with any other flags and variables, e.g, data offset, for the PDU or FCP frame header. The local header is updated with the TCP Control Block Index or the FCP D_ID from the PTD, step 1008. The port number is also added to the local header. The finished iSCSI PDU or FCP frame is sent to the PACE, step 1010, which removes the local header, step 1012, and forwards the packet to the appropriate port, 1014.

Mirroring

A potential deadlock situation can occur when a storage switch performs a mirroring operation (routing data to a mirrored virtual target) to make data available from multiple physical locations. As previously described, a mirroring operation can include receiving a request to write data to a virtual target and routing the data from an initiator to multiple physical targets. To provide high performance, a storage switch can simultaneously or synchronously multicast data to multiple targets without buffering the data within the storage switch. In this manner, a storage switch can route data between an initiator and multiple targets without introducing any more latency into the operation than would be introduced by a typical network switch.

By providing such a high performance switching operation, however, a storage switch can encounter a potential deadlock situation caused in part by the limited ability of targets to receive data from initiators. For example, most physical targets only include a limited number of transfer ready resources. That is, most physical targets can only accept a limited number of requests or commands to write data at a given time. Accordingly, these targets typically manage their limited ability to receive data by issuing transfer ready signals to initiating devices to indicate their availability to receive data. For example, devices using a fibre channel protocol typically issue XFER_RDY frames to initiating devices in response to write commands to indicate the target's availability to receive data. Similarly, devices using the iSCSI protocol typically issue R2T frames to initiating devices to indicate availability. For clarity of discussion, reference may be made herein to. only XFER_RDY or R2T signals while discussing exemplary embodiments. It will be understood, however, that the invention is not limited to any given signal, protocol, or type of transfer ready resource. Embodiments in accordance with the present invention may be applicable to any protocol or type of indication a target may issue to indicate an ability or readiness to receive data.

Figure 11A:
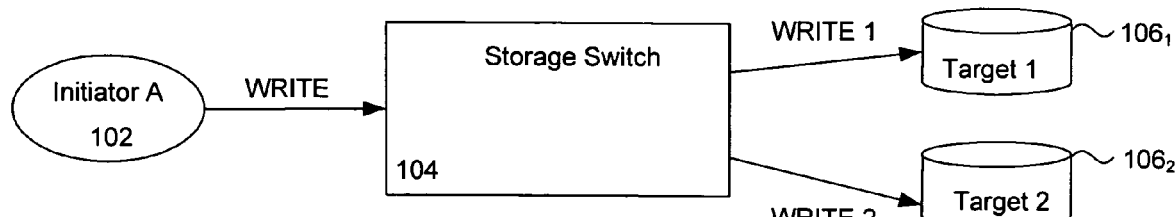
FIGS. 11a-11b depict a functional block diagram of a storage area network and a communication flow for an exemplary mirroring operation.
Figure 11B:
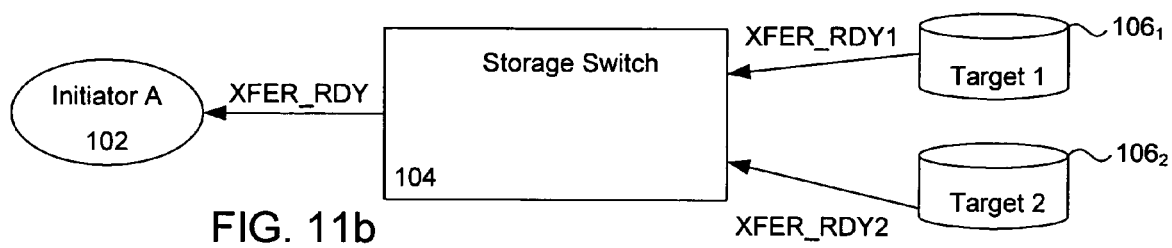

FIGS. 11a-11b depict a functional block diagram of a storage area network including a communication flow for an exemplary synchronous mirroring operation. The simplified storage area network of FIGS. 11a-11b includes an initiator 102, a storage switch 104, and two physical targets $106_1$ and $106_2$. Physical targets $106_1$ and $106_2$ can represent individual storage devices or separate LUs of one or more storage devices.

In a synchronous mirroring operation, storage switch 104 can multicast data frames simultaneously from physical initiators, such as initiator 102, to physical targets $106_1$ and $106_2$.

In order to achieve a high performance unbuffered implementation, storage switch 104 waits for a XFER_RDY frame (or other suitable indication under another protocol) from each of the physical targets involved in the mirroring write operation before issuing a XFER_RDY frame to the physical initiator. After receiving XFER_RDY frames from each of the physical targets, storage switch 104 sends a XFER_RDY frame to the physical initiator, thus indicating to the initiator to begin sending data packets.

As illustrated in FIG. 11a, a write operation to a mirrored virtual target can begin with physical initiator 102 issuing a write command to storage switch 104. Switch 104 can determine, from a VTD including a FLOW ID for the virtual target, the physical targets corresponding to the virtual target. After receiving the command, the storage switch will route the write command from the ingress port to each of the egress ports connected to the physical targets associated with the write command. Each egress port then issues a write command to its respective physical target. Reference may be made hereinafter to egress and ingress ports receiving and providing signals as well as performing various other processing functions. When reference is made to a port (e.g., port 4021a of FIG. 4) performing a function (e.g., processing a command or request) or providing a signal, it is to be understood that a processing unit associated with the port (e.g., PPU 4061 associated with port 4021a) may be involved in or perform such functionality. For example, a command may be received at a port and be processed by a PPU. The PPU may initiate a task relating to the command and provide various signals to other ports and PPUs.

Storage switch 104 will not issue a XFER_RDY frame to physical initiator 102 until it receives a XFER_RDY frame from each of the physical targets. In this manner, storage switch 104 ensures that data can be multicast to each of the physical targets without temporarily copying or buffering data received from the initiator. As illustrated in FIG. 11b, a XFER_RDY 1 frame is received from the first physical target and a XFER_RDY 2 frame is received from the second physical target. After receiving each of these XFER_RDY frames, storage switch 104 issues a XFER_RDY frame to physical initiator 102. If either XFER_RDY 1 or XFER_RDY 2 from physical target 1 or 2 is not returned to storage switch 104, storage switch 104 will not return a XFER_RDY frame to physical initiator 102.

Figure 12A:
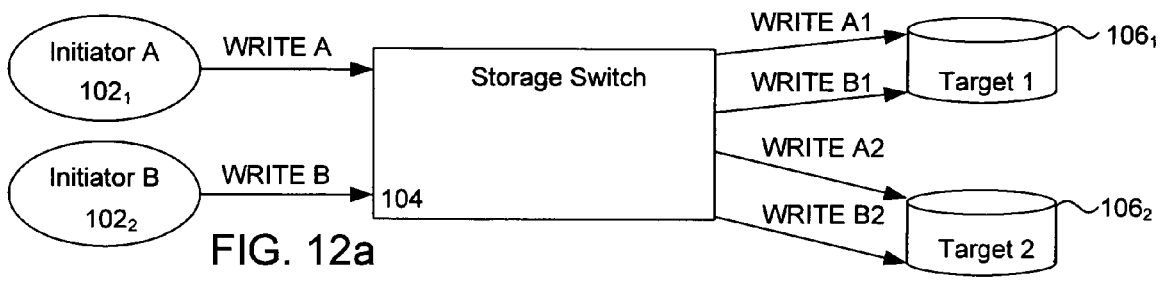
FIGS. 12a-12b depict a functional block diagram of a storage area network and a communication flow for an exemplary mirroring operation.
Figure 12B:
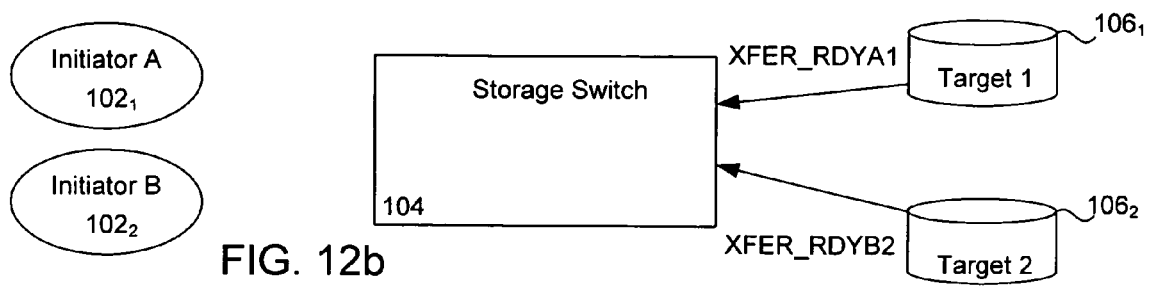

A potential deadlock situation can occur when switch 104 waits for a transfer ready signal from multiple targets before issuing a transfer ready signal to an initiator. FIGS. 12a-12b, for example, illustrate a situation in which two write commands to a mirrored virtual target are processed by storage switch 104. Initiator $102_1$ issues a write A command to storage switch 104 and initiator $102_2$ issues a write B command to storage switch 104. The individual write commands are received on one or more ingress ports of storage switch 104 and multicast to each of the physical targets for the virtual target. As illustrated, storage switch 104 issues write A1 to physical target $106_1$ and write A2 to physical target $106_2$ after receiving write A. After receiving a write B command for the same virtual target, storage switch 104 issues write B1 to physical target $106_1$ and write B2 to physical target $106_2$.

In the scenario illustrated in FIG. 12a, write A1 arrives at target 1 prior to write B1, and write B2 arrives at target 2 prior to write A2. If it is assumed that each target can only issue one XFER_RDY frame at a time, target 1 will only return XFER_RDY A1 and target 2 will only return XFER_RDY B2, as illustrated in FIG. 12b. It will be understood that reference to an ability to issue only one resource or signal is exemplary and that devices capable of issuing any number of transfer ready resources or signals can be used in accordance with various embodiments. As previously described, storage switch 104 will not issue a XFER_RDY frame to the physical initiator until it receives a XFER_RDY frame from each of the physical targets associated with the write command. In the scenario illustrated in FIGS. 12a-12b, storage switch 104 will not return a XFER_RDY to physical initiator $102_1$ because it has not received XFER_RDY A2 from physical $106_2$. Likewise, storage switch 104 will not return a XFER_RDY B signal to physical initiator $102_2$ because it will not receive a XFER_RDY B1 signal from physical target $106_1$. This scenario will cause both the write A and write B commands to fail. Such a scenario causes a deadlock situation within the storage switch.

In addition to the deadlock associated with storage switch 104, physical target $106_1$ will be in a deadlock situation because it will have issued XFER_RDY A1, but will not receive write data from storage switch 104 or physical initiator $102_1$ in response to the XFER_RDY signal. Because target $106_1$ does not receive data in response to its issued transfer ready signal, it is effectively deadlocked and is not free to issue a transfer ready signal in response to subsequent commands. Target 2 will be in a similar deadlock situation, waiting to receive data in response to its issued transfer ready signal, XFER_RDY B2.

Reactive Deadlock Detection and Removal

In accordance with one embodiment, a deadlock situation can be detected by a storage switch and managed in order to maintain performance of the switch and network for a mirrored write operation. Abort commands can be utilized to free resources allocated by the physical targets and to clear the state of the pending command. Additionally, a queue depth for the requested virtual target can be lowered to decrease the number of requests the switch will process for the virtual target and consequently, the number of requests issued to the physical targets of the requested virtual target.

FIGS. 13a-13d depict a functional block diagram of a storage area network including a storage switch 104 in accordance with one embodiment. FIG. 14 is a flowchart for performing a synchronous mirroring operation that can include the use of a storage switch 104.

Figure 13A:
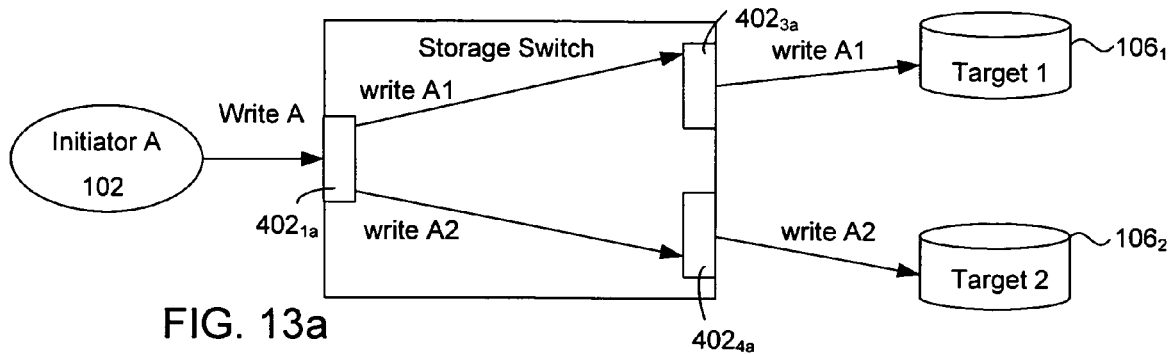
FIGS. 13a-13d depict a functional block diagram of a storage area network and a communication flow for an exemplary mirroring operation in accordance with one embodiment.
Figure 13B:
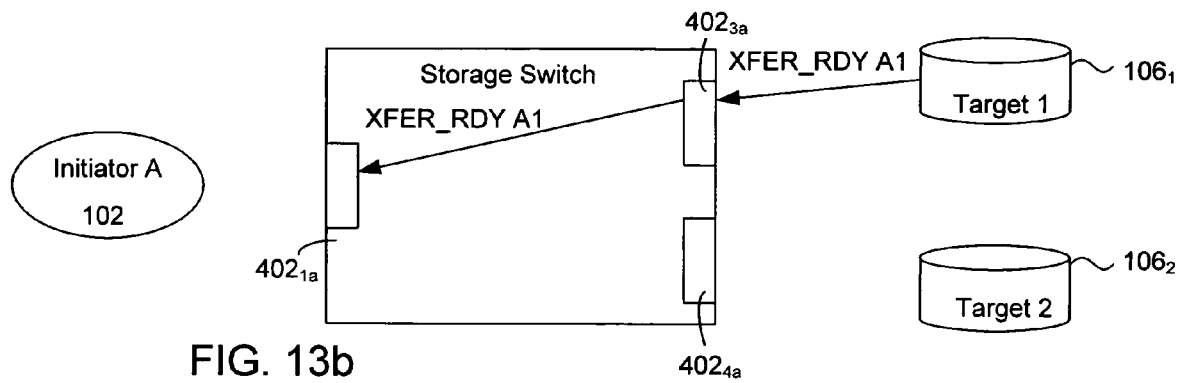

Operation of a synchronous mirroring operation can begin when the storage switch receives a command, step 1402, such as the write A command depicted in FIG. 13a. In one embodiment, the write command can be received at an ingress port of the switch (e.g., port $402_{1a}$ depicted in FIGS. 13a-d and FIG. 4). After determining the physical locations corresponding to the requested target (e.g., from a VTD for the virtual target), a write A command is issued to each physical target of the virtual target, step 1404. As illustrated in FIG. 13a, the storage switch can multicast the write command to the physical targets specified in the VTD for the mirrored target. In one embodiment, the write command is routed to the physical targets via the egress ports (e.g., $402_{3a}$ and $402_{4a}$) connected to the physical targets. Although the example presented with respect to FIGS. 13a-13d includes a virtual target having two corresponding physical targets, it will be appreciated that in accordance with various embodiments, any number of physical targets can be used. Furthermore, although the example of FIG. 13a-d shows each target and the initiator connected to an individual port of the switch, other embodiments may have one or more targets and/or initiators connected to the same port. For example, a target and initiator or multiple targets can be connected to the same port through a typical level 2 networking switch. In such embodiments, various processing described hereinafter as distributed amongst multiple ports can be performed at a single port.

The switch checks the status of the pending commands to determine if all the targets have returned a signal to indicate the availability of a transfer ready resource, step 1406. If each physical target returns a transfer ready signal, the switch will provide a transfer ready signal to the initiator from the ingress port, step 1416. At step 1418, the initiator will provide one or more data packets to the switch in accordance with the transfer ready signal. The data packets are then routed and multicast by the switch to each of the physical targets of the mirrored virtual target.

In accordance with one embodiment, a timeout period is implemented at step 1406 to detect any actual or potential deadlock occurrences. In one embodiment, a timer is initiated at the ingress port receiving the write command. For example, PPU $406_2$ may initiate a timer when a command is received at port $402_{1a}$. The storage switch can check the status of the write commands provided to the physical targets to determine if all the transfer ready signals have been returned within a predetermined amount of time after issuing the commands. Various timeout periods may be appropriate and used in individual implementations depending upon various design considerations. For example, different physical targets and different configurations for a network can lead to different times in which a target can be expected to return a resource if there is no deadlock. Additionally, the traffic being handled by an individual target at any given time can effect a target's time to return a resource. A timeout period can be chosen given these considerations as well as others. In one exemplary embodiment, a timeout period of five seconds can be used, although it will be understood that periods of less or more than five seconds can be used. In the scenario depicted in FIG. 13b, a transfer ready signal is returned by target 1 but not by target 2, within the timeout period. If more than two physical targets correspond to the virtual target, the switch will determine at step 1406 if a transfer ready signal is received from each of the physical targets.

Figure 13C:
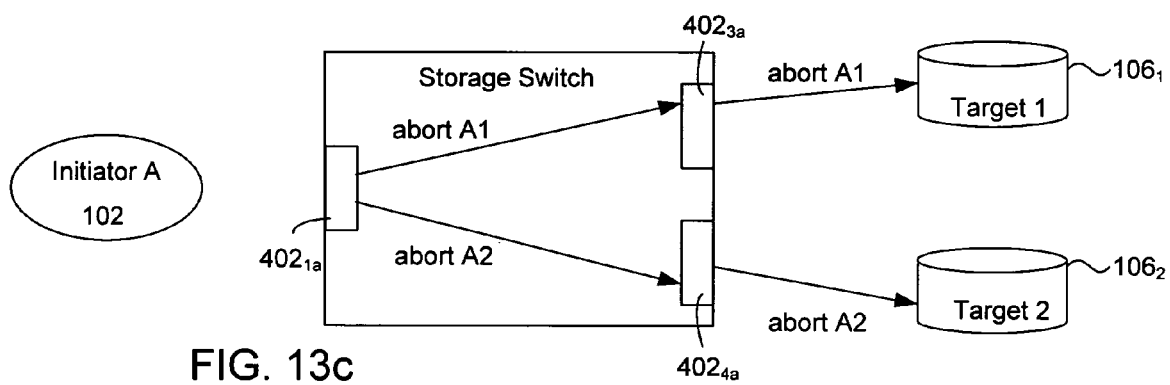
Figure 14:
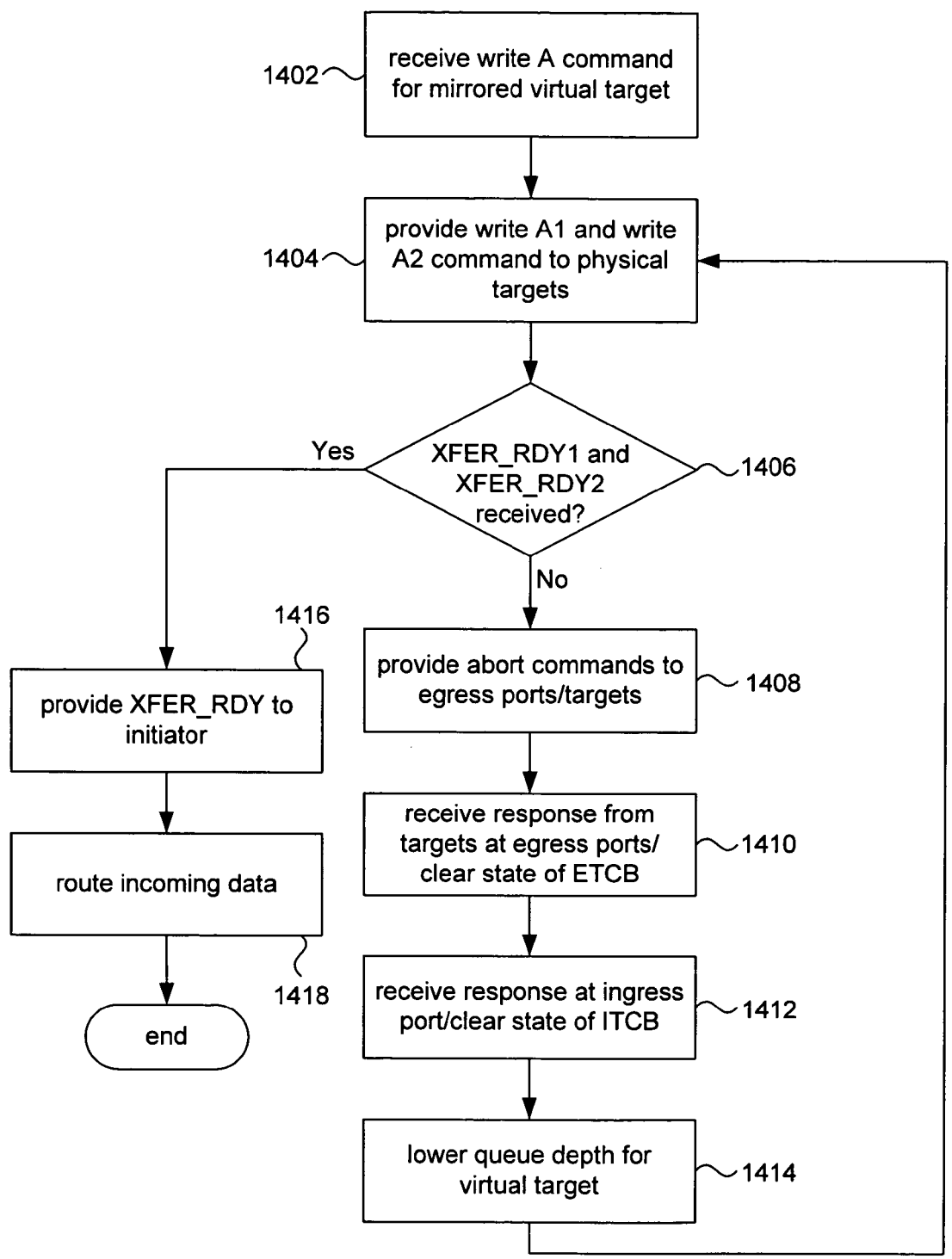
FIG. 14 is flowchart illustrating a mirroring operation in accordance with one embodiment.

If each target does not return a transfer ready resource within the timeout period, as determined at step 1406, an abort command is sent to abort the pending write request at each physical target, step 1408. In one embodiment, an abort command is first issued from the ingress port (e.g., $402_{1a}$) to the egress port(s) (e.g., $402_{3a}$ and $402_{4a}$) connected to the physical targets of the virtual target, as illustrated in FIG. 13c. a PPU associated with the ingress port can provide the abort command to the PPUs of the egress ports connected with the physical targets. At the egress port(s), the status of the write command can be updated, such as by updating the status of an ETCB allocated for the pending write request at each egress port. The status can be updated to indicate that the command has been aborted. After receiving an abort command, the physical targets will clear the request and free any allocated transfer ready resources.

Figure 13D:
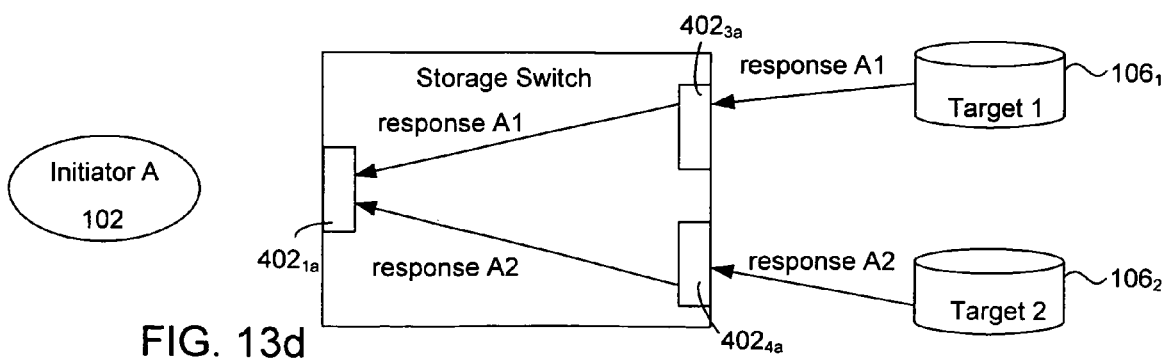

The physical targets will then return responses confirming acceptance of the abort command to the egress ports, as illustrated in FIG. 13d. The egress ports receive the responses and clear the state of the command at the port, step 1410. For example, PPU $406_3$ of egress port $402_{3a}$ can free an ETCB allocated and stored in SRAM $405_3$. The egress ports each then return a response to the ingress port where the state of the ITCB for the command is updated so that the write command will be retried, step 1412.

In one embodiment, after receiving the responses at the ingress port, the queue depth for the requested virtual target is lowered, step 1414. The queue depth is the maximum number of commands or maximum count of requests the storage switch (or a port of the storage switch) will process for a virtual target. In one embodiment, the queue depth is lowered to a value of one at step 1408, such that the switch only processes one request for the virtual target. In other embodiments, the queue depth can be lowered to values other than one. For example, if the number of transfer ready resources each of the targets can issue is known, the queue depth can be lowered to the lowest maximum number available from a target. Any number of values can be used in accordance with various embodiments according to the desired characteristics of a particular implementation.

Additionally, various queue depths can be used in accordance with embodiments to manage the requests from one or more initiators. For example, in one embodiment a mirrored virtual logic unit (VLU) can be provisioned for access by a single initiator such as a single server connected at one ingress port. The queue depth for that VLU can be lowered to reduce the number of commands the switch will process for the VLU from that server. If multiple servers are connected at a single ingress port or through multiple ports at a single processing unit in a clustered configuration, for example, the queue depth can be lowered to reduce the number of commands the switch will process for the VLU from any of the servers connected at that port. In another embodiment, a queue depth can be established at the switch level to reduce the number of commands the switch will process at all ports for a given VLU. For example, the same virtual target may be accessible to multiple initiators connected at multiple ports. Multiple instances of the virtual target may be provisioned at each ingress port through which an initiator accesses the virtual target. A queue depth for the number of commands the switch will process for all instances of the target can be used to limit the total number of requests the switch will process for the target.

After lowering the queue depth, the write A1 and write A2 commands can be re-issued to the egress ports which forward the commands to the physical targets, as illustrated in FIG. 13a. In one embodiment, the write commands pending before a deadlock situation is detected are re-issued without checking to determine if the queue depth will be exceeded. The queue depth will only be checked for newly received commands, thus allowing the pending requests to be more quickly executed.

Various techniques can be used in accordance with embodiments to process new requests received for the mirrored virtual target that are above the maximum command count (queue depth). In one embodiment, the storage switch simply returns a busy or task set full status to the initiating device. The initiator can then re-send the write request and the switch will again check to determine if the maximum command count is met. In other embodiments, the storage switch can handle the new requests internally to avoid sending failure responses to the initiator. In one example, the new requests are maintained within a loop and retried. As new requests are received, the command count is checked. If the count will be exceeded by the addition of the new request, the request can remain in a process loop. For example, the request can be routed from the ingress port through a traffic manager into the switch fabric. The request can then be routed back to the ingress port where the command will be reprocessed. The queue depth will be checked after each loop through the switch fabric and back to the ingress port until the maximum command count is not exceeded. In another example, incoming commands can be maintained in a queue (e.g., within SRAM 405 of the ingress port), and retried in the order in which they were received. When the number of commands being processed drops below the queue depth, the command at the head of the queue is dequeued and the write command routed to the physical devices.

In one embodiment, the queue depth for a virtual target is gradually increased after being lowered to increase the performance of a switch following deadlock detection. A timer can be started when the deadlock is detected (e.g., when a target fails to return a XFER_RDY within a timeout period). If no subsequent deadlocks are detected within a certain time period, the queue depth is increased. The queue depth can continue to be increased at prescribed intervals. In one embodiment, for example, an initial time period of 15 minutes is established. If no deadlocks are detected for a 15 minute period following deadlock detection, the queue depth is increased by one. After another minute, if no deadlocks are detected, the queue depth is again increased by one (and so on). A maximum command count to which the queue depth will be increased can be established in one embodiment. In one embodiment, the maximum command count can be established at or near a value used when a deadlock was detected.

Proactive Transfer Ready Resource Management

In accordance with one embodiment, a physical target's ability to provide transfer ready signals is effectively managed to avoid deadlock situations such as that depicted in FIGS. 12a-12b. In accordance with one embodiment, a physical target's ability to return a transfer ready signal is ensured prior to issuing a write command to the target. For example, a storage switch in accordance with one embodiment can manage a physical target's ability to issue XFER_RDY frames or another suitable signal in order to only issue write commands to physical targets when the target's ability to respond with a XFER_RDY frame is insured. In this manner, deadlock situations can be avoided or alleviated altogether. In one embodiment, a storage switch can provision or maintain an indication of a physical target's ability to issue transfer ready signals. For example, the storage switch can maintain a value indicating the available number of XFER_RDY or R2T frames a physical target can issue. In one embodiment, the management of transfer ready resources to avoid deadlock can be used in conjunction with techniques to detect and alleviate deadlock as described with respect to FIGS. 13 and 14. In other embodiments, a single technique can be implemented to either detect and alleviate deadlock or to avoid deadlock.

FIGS. 15a-15f depict a functional block diagram of a SAN including a storage switch 104 in accordance with one embodiment. Storage switch 104 is implemented in accordance with an embodiment to effectively manage transfer ready resources of physical targets such as target $106_1$ and $106_2$ to avoid deadlock situations. A communication flow depicted in FIGS. 15a-15f illustrates an exemplary operation of storage switch 104 in accordance with one embodiment. Although FIGS. 15a-15f depict a network including two targets corresponding to a virtual target, it will be appreciated that embodiments can be implemented using any number of physical targets corresponding to a virtual target. For example, in one embodiment, a mirrored virtual target can include three, four, or more physical targets. Furthermore, although the example of FIGS. 15a-f shows each target and the initiator connected to an individual port of the switch, other embodiments may have one or more targets and/or initiators connected to the same port. In such embodiments, various processing described hereinafter as distributed amongst multiple ports can be performed at a single port.

Figure 15A:
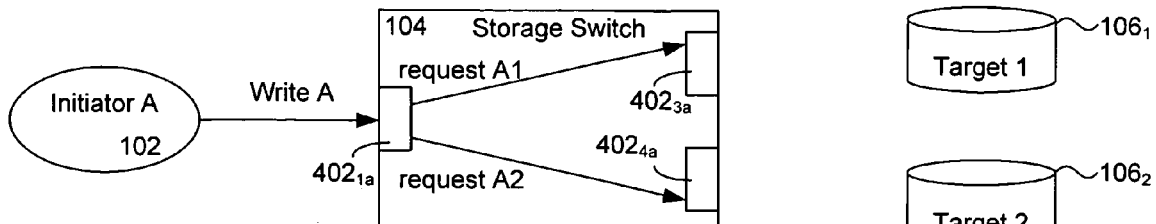
FIGS. 15a-15f depict a functional block diagram of a storage area network and a communication flow for an exemplary mirroring operation in accordance with one embodiment.

Physical initiator 102 first issues a write A command to storage switch 104 (FIG. 15a). The write A command can be received on an ingress port $402_{1a}$ of storage switch 104 (see FIG. 4). After receiving the write A command at the ingress port, storage switch 104 issues request signals A1 and A2 to the egress ports connected to the targets associated with the virtual target of the write A command (e.g., egress ports $402_{3a}$ and $402_{4a}$). Each egress port receiving a request signal checks the transfer ready resources associated with the respective physical target connected to the port to determine if a XFER_RDY frame, for example, is available. For example, PPU $402_{3a}$ can check a resource table stored in SRAM $405_3$ to determine the availability of a XFER_RDY frame from a target connected to egress port $402_{3a}$.

In one embodiment for example, a value indicating the availability of a XFER_RDY frame from a physical target coupled with an egress port can be maintained in a memory associated with the egress port. For example, a resource table indicating the availability of transfer ready signals from physical target $106_1$, connected to egress port $402_{3a}$, can be maintained in SRAM $405_3$, while a resource table indicating the availability of transfer ready resources from physical target $106_2$, connected to egress port $402_{4a}$, can be maintained in SRAM $405_4$. In one embodiment, a memory associated with a particular port is used to maintain a resource table for physical devices connected to that port. For example, a resource table for devices connected to port $402_{3a}$ may be maintained in SRAM $405_3$ while a resource table for devices connected to port $402_{4a}$ may be maintained in SRAM $405_4$. In another embodiment, one or more resource tables for one or more physical devices connected to a switch can be maintained in a single memory accessible to each port of the switch.

If a XFER_RDY frame is available from the physical target, the egress port, via an associated packet processing unit for example, can decrement the value from the resource table and send a success response back to the ingress port issuing the request command. For example, as illustrated in FIG. 4, a success command can be issued from port $402_3$, via storage processing unit $401_3$, to storage processing unit $401_1$ to indicate availability of a XFER_RDY frame from physical target $106_1$.

Figure 15B:
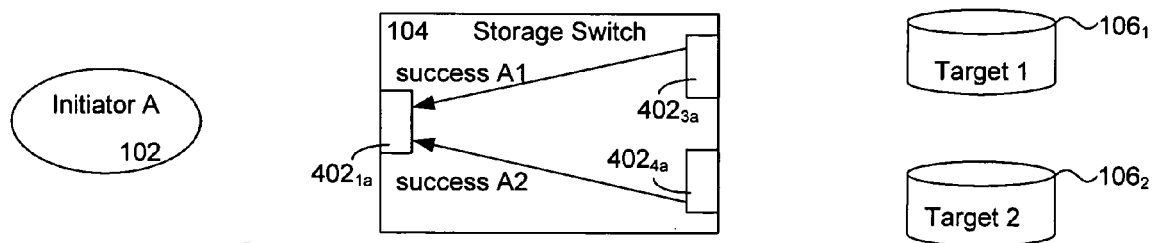
Figure 15C:
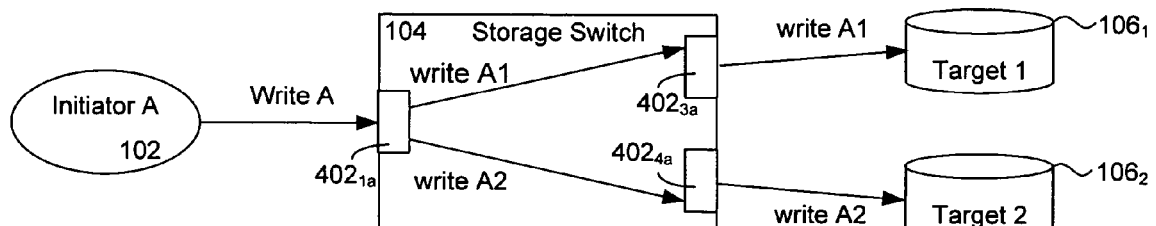

In FIG. 15b, success responses are issued by egress ports $402_{3a}$ and $402_{4a}$ to ingress port $402_{1a}$. If the virtual target includes more than two physical targets, each egress port connected to a physical target of the virtual target will return a success (or failure) response to the ingress port. In this example, each of the egress ports was able to confirm the availability of a transfer ready resource from their respective physical target $106_1$ or $106_2$. After receiving success responses A1 and A2 from egress ports $402_{3a}$ and $402_{4a}$, ingress port $402_{2a}$ multicasts (via traffic managers and the switch fabric, for example) write commands (write A1 and write A2) to each of the egress ports as illustrated in FIG. 15c. The egress ports then issue the write commands to the physical targets.

Figure 15D:
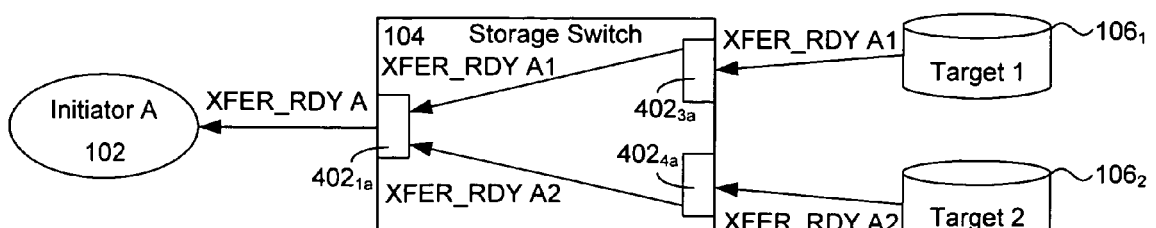

After issuing the write commands to the physical targets, each of the physical targets will return a XFER_RDY frame to the egress ports, as illustrated in FIG. 15d. The egress ports will return the XFER_RDY signals to ingress port $402_{1a}$. After each of the XFER_RDY frames are received by ingress port $402_{1a}$, a XFER_RDY frame is returned to the physical initiator. Upon receipt of the XFER_RDY signal, the physical initiator can provide one or more data frames to storage switch 104. In one embodiment, the XFER_RDY signal specifies the maximum number of packets the initiator should issue, the number being the lowest number returned by a physical target. Storage switch 104 can then multicast the data to physical targets $106_1$ and $106_2$, through egress ports $402_{3a}$ and $402_{4a}$, without buffering the data in the storage switch.

Figure 15E:
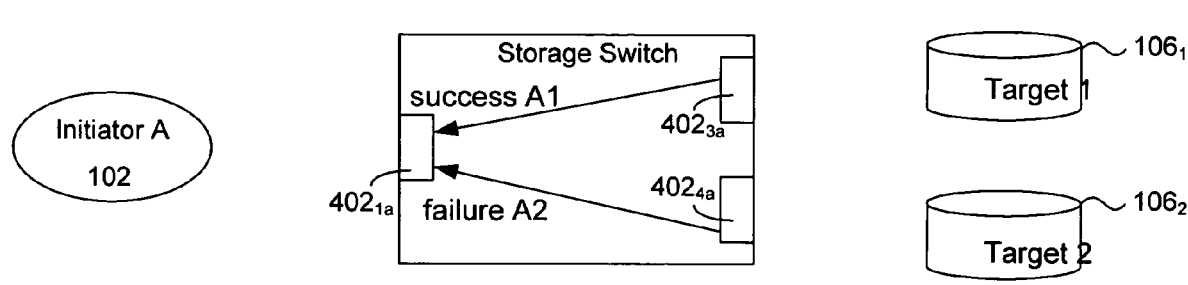
Figure 15F:
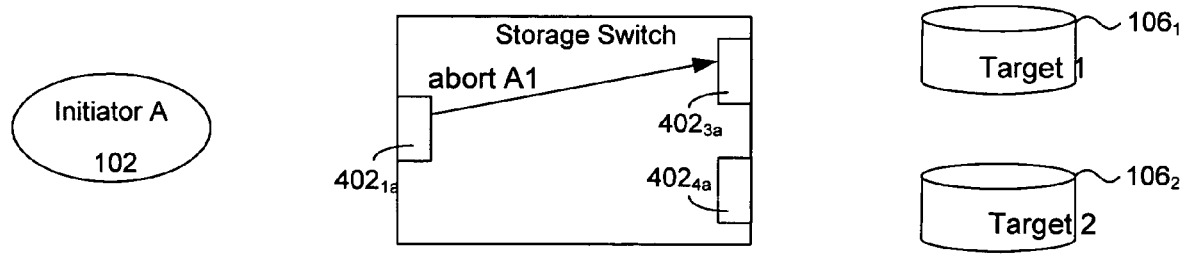

FIG. 15e illustrates a scenario where a transfer ready resource is not available from a physical target. Egress port $402_{3a}$ is able to confirm that a XFER_RDY frame is available from target 1, such as by checking a resource table stored in SRAM $405_3$. Egress port $402_{4a}$, however, is unable to confirm the availability of a XFER_RDY frame from physical target $106_2$. Accordingly, egress port $402_{3a}$ returns a success response A1 to ingress port $402_{1a}$, while egress port $402_{4a}$ returns a failure response A2 to ingress port $402_{1a}$. Because the egress ports decrement the value indicating the availability of transfer ready resources from a physical target upon confirming the availability of a transfer ready resource, abort messages are sent to the egress ports sending success responses if any egress port returns a failure response. For example, if the virtual target includes four physical targets and three success responses and one failure response are received from the egress ports, an abort command will be issued to the three ports returning success responses. FIG. 15f illustrates ingress port $402_{2a}$ issuing an abort A1 command to egress port $402_{3a}$. Upon receiving the abort command, egress port $402_{3a}$ can increment the transfer ready resource value associated with physical target $106_1$ to indicate the availability of the previously allocated resource. In this manner, egress port $402_{2a}$ can determine that physical target $106_1$ is available to receive a further command in response to a subsequent request and issue a XFER_RDY frame.

Various indications of the availability of transfer ready resources from targets can be used in accordance with various embodiments. In one embodiment, a resource table is established that indicates the number of transfer ready resources a target has available. The total number of transfer ready resources a target can issue can be determined from device specifications in one embodiment and provided to storage switch 104 through a management station. In another embodiment, the total number can be determined dynamically during a discovery process. For example, during a discovery process with no outstanding commands pending at a target, a switch can dynamically determine the total number of resources a target can issue. The switch can issue a command to the target and determine if a transfer ready signal is returned. Without responding to the target to release the resource, the switch can issue another command and determine if a transfer ready signal is returned. The switch can determine the total number of requests a target can issue by issuing commands until no resource is returned. This total number of resources can be provisioned to the resource table.

In one embodiment, a default value of 1 is used for a target. By using a value of 1, reliability of the determination of the availability of a resource from a target can be guaranteed without actually knowing the maximum number of resources the target can issue. At minimum, all targets can issue one transfer ready signal. Thus, by defaulting the total number of resources of a target to 1, a safe and reliable operation can be maintained. When a success response is returned, the value can be set to 0, for example, to indicate that no transfer ready resources are available from the target.

In accordance with one embodiment, the number of transfer ready signals a target can issue per LUN is provisioned in addition to or in place of the number of signals the target can issue per port. For example, FIG. 2 depicts a physical device $107_1$ having three logical units: LU1, LU2, and LU3. An entry in a table for this target may indicate that the physical device can issue 3 transfer ready signals per port and 2 transfer ready signals per LUN. In this manner, an egress port can determine if a target can issue the needed transfer ready signals at the port and/or LUN level. For example, a write command to a virtual target may include writing data to LU1 of target $107_1$. The egress port connected to device $107_1$ may determine that one resource is available for the port of the target but that no resources are available for LU1. Accordingly, the egress port can return a failure response to the requesting ingress port.

In accordance with one embodiment, a circular first in/first out (FIFO) buffer can be used to maintain information relating to write commands to mirrored virtual targets. In one embodiment, the FIFO is a circular software FIFO maintained in memory for an ingress port (e.g., SRAM $405_1$ for ingress port $402_{1a}$). When a write command is received from a physical initiator on an ingress port of the storage switch, information relating to the write command can be enqueued into the circular FIFO for processing. In one embodiment, a FIFO is established for each ingress port (or for each processing unit in embodiments where a single processing unit is dedicated to more than one port as depicted in FIG. 4). In other embodiments, a FIFO can be used for multiple ports or for an entire switch.

In one embodiment, the information queued in the write FIFO buffer is a pointer to an ingress task control block (ITCB) for an incoming write command. As previously discussed, when a command is received, an ITCB can be allocated and placed into memory accessible to the ingress port. The ITCB can specify such information as the FlowID, VTD ID, CmdSN, and initiator_task_tag (iSCSI PDU) or OX_ID (FCP frame header). The FIFO can reference the write command by its ITCB in order to queue, track, and execute the command. In another embodiment, the FIFO can directly include such information as a task index, flow ID (multicast flow ID), mirroring information (location of targets), target status (returned success or returned failure), and the state of the command (e.g., resources available/not available).

By placing incoming write commands (or information relating thereto) into the circular software FIFO, the ingress port can continue to process other incoming commands. After receiving and queuing information for a write command requiring a mirrored data transfer, request messages can be multicast to the egress ports connected to the physical targets associated with the write command as previously described. If XFER_RDY frames are available, as determined by the egress ports associated with the physical targets, the process will continue as previously described with respect to FIG. 12a-12b. The write command can be issued to the targets and then dequeued from the circular FIFO.

If XFER_RDY frames are not available from each of the physical targets associated with the write command, the ingress port can maintain the write command in the FIFO and continue to process other incoming commands. After a random amount of time, such as between 0 milliseconds and 1 millisecond, the ingress port can check the head of the FIFO and retry the requests associated with the command at the head entry. If the ingress port receives success responses from each of the egress ports, the write command is issued to each of the egress ports and dequeued from the FIFO. The egress ports will transfer the write commands to the physical targets. If the ingress port does not receive success responses from each of the egress ports, the write command will be maintained in the FIFO and retried after another random amount of time. In one embodiment, the amount of time is the same between retries. In another embodiment, the amount of time is random and changes between retries.

The time period between accesses to the head of the FIFO can be varied, or random, to decrease the probability that event(s) causing multiple and simultaneous (or near simultaneous) requests of transfer ready resources from the same targets will reoccur. As previously discussed, a FIFO may be established for each ingress port of a switch and write commands received at each port individually processed. Additionally, multiple switches may be connected to the same physical targets. Because multiple switches and/or ingress ports may request the same transfer ready resources of targets at a single time, a random amount of time can be used between accesses to the FIFO head for a particular ingress port to decrease the probability that the multiple ports and/or switches will again simultaneously request the same resources. For example, ingress port $402_{1a}$ and $402_{2a}$ may simultaneously request the only transfer ready resource of target $106_1$ and the only transfer ready resource of target $106_2$. Ingress port $402_{1a}$ may receive a success from the egress port connected to target $106_1$ and a failure from the port of target $106_2$, while ingress port $402_{2a}$ may receive a success from the port of target $106_2$ and a failure from the port of target $106_1$. If each ingress port subsequently retries its request at the same time, they will again each receive one success and one failure response. A random amount of time between retries of the FIFO head for an ingress port can be used to avoid such a reoccurring situation.

In accordance with one embodiment, a timer is started after a command is received and queued into the FIFO at the ingress port. If an entry into the FIFO is not dequeued by the time the timer expires, the entry is marked retired. If a head entry is retired and the FIFO is checked after the random interval, the check will skip the retired entry and move to the next entry. The FIFO will continue to be checked until a non-retired entry is found. After finding a non-retired entry, request messages are sent to the appropriate egress ports associated with the command. If success responses are received at the ingress port in response to each request, the command is immediately dequeued from the FIFO even though it is not at the FIFO head. The entry will then be marked retired. The next time this entry appears at the FIFO head, the entry can be skipped. After the head of the FIFO moves beyond the retired entry, a newly received command can be queued in place of the retired entry. In accordance with one embodiment, if a command is attempted to be queued into the FIFO and the FIFO is full, the command can be rejected by the storage switch. The storage switch can return a busy status or other appropriate command to the physical initiator.

Figure 16:
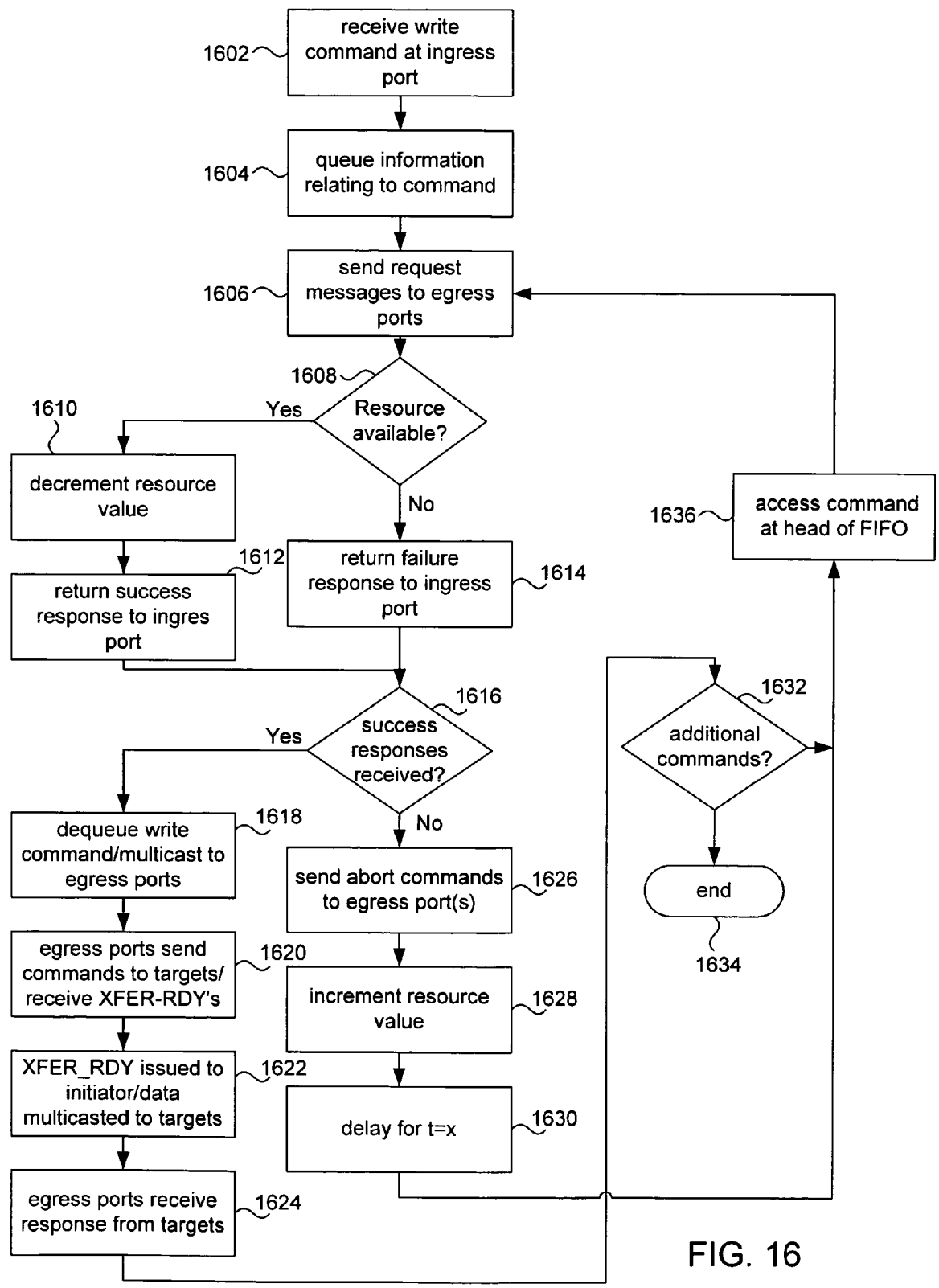
FIG. 16 is a flowchart illustrating a mirroring operation in accordance with one embodiment.

FIG. 16 is a flow chart for performing a synchronous mirroring operation (writing to a mirrored virtual target) in accordance with one embodiment. At step 1602, a write command is received at an ingress port of the storage switch. After classifying the command and determining that it is for a mirrored virtual target, the storage switch queues information relating to the write command in a first in/first out (FIFO) buffer at step 1604. In one embodiment, the information (e.g., a pointer to an ITCB) is stored in a memory such as an SRAM 405 of FIG. 4. At step 1606, the ingress port receiving the write command from the initiator issues request messages to each of the egress ports connected with the physical targets associated with the write command. In accordance with various embodiments, write commands for a virtual target can be associated with any number of physical targets as previously described.

At step 1608, each of the egress ports receiving a request message will check to determine whether the physical target connected with the egress port has an available transfer ready resource (e.g., XFER_RDY or R2T) available, such as by checking a resource table associated with the physical target to determine if the resource is available. The table as previously described, may contain a value indicating whether a XFER_RDY signal can be issued by the physical target. At step 1608, a determination is made by the egress port as to whether a XFER_RDY signal is available. If a resource is available, the resource value maintained in the table is decremented at step 1610. After decrementing the resource value, a success response is returned to the ingress port at step 1612. If a XFER_RDY signal was not available from the physical target, a failure response is returned to the ingress port at step 1614. It should be noted that steps 1608 through 1614 are individually performed by each of the egress ports or processing units receiving the request message from an ingress port.

At step 1616, the ingress port determines whether success responses were received from each of the egress ports to which a request was sent. If a success response was received from each of the egress ports, the write command is dequeued from the circular FIFO at step 1618, and multicast to each of the egress ports. At step 1620, each of the egress ports receiving the write command will issue a write command to the respective physical target to which the port is connected and receive a XFER_RDY frame from the physical target indicating its availability to receive data. At step 1622, a XFER_RDY frame is issued to the physical initiator, prompting the transfer of data packets through the switch to the targets. In one embodiment, the data packets are multicast to the physical targets from the initiator without buffering the data in the switch. After the data is written to the targets, responses will be received from the targets at step 1624 indicating transfer completion. After receiving the responses, the egress ports will increment the resource value to indicate the availability of a transfer ready resource from the respective target. At step 1632, the storage switch determines whether additional write commands are awaiting execution. If there are additional write commands, the flowchart will proceed to step 1636 to access the write command at the head of the FIFO.

If at step 1616 the ingress port did not receive success responses from each of the egress ports, abort commands are sent to each of the egress ports that returned a success response at step 1626. The abort commands are sent to ensure that the transfer ready resources of the physical targets are made available for further commands as previously described. At step 1628, egress port(s) receiving an abort command will increment a resource value stored in an associated table to indicate availability of a transfer ready resource from the physical target. At step 1630, the storage switch will delay for a random period of time x (e.g., 0 to 1 ms) before accessing the write command at the head of the FIFO buffer at step 1634.

In accordance with one embodiment, an error recovery scheme is provided by the storage switch to prevent mismanagement of transfer ready resources due to the loss of messages within the switch. As previously discussed, after the storage switch receives and queues a command, it will send request messages to the egress ports. These request messages may be lost during transfer between the egress and ingress ports. If each of the messages are lost, no transfer ready resources will be allocated for the request at any of the egress ports. The command will receive no responses from the egress ports and will remain in the FIFO. As previously described, a timer can be started when the command is first enqued at the ingress port. The command will be retired from the FIFO at the expiration of the timer. This command will be skipped if it appears at the FIFO head after being retired. If, however, some messages are lost and some are not, the transfer ready resources will be allocated at the egress ports receiving the request messages causing deadlock at the egress port.

For example, a request message may be received at an egress port and a transfer ready resource allocated in response thereto. If a request message is lost on the way to an egress port, the ingress port will not receive responses from every egress port and will wait until the FIFO entry times out and the associated command is retired. An egress port receiving a request and issuing a success response will wait for a command in response to issuance of the success response. Because the ingress port has dropped the command and the egress port is waiting for the command, the ingress and egress ports will have essentially lost communication. Since the transfer ready resource of the physical target was allocated at an egress port, other request messages for the same resource will fail and receive failure responses from the egress port due to allocation of the transfer ready resource to the other task.

Using additional timers at the egress port(s) in one embodiment can prevent such a resource depletion situation. When the egress port receives a request message, it can start a task associated with the message and a timer for the associated task. After issuing a success response to the ingress port, the task can be marked, for example, "resource allocated". If a failure response is returned and a resource not allocated, the task can be marked, for example, "resource not allocated".

If the task timer expires, the task will time out at the egress port, prompting the release of the transfer ready resource if it is marked resource allocated. In this manner, new request messages received at the egress port for the same resource, will be able to acquire the resource.

When a response message from an egress port or an abort message from an ingress port is lost, the previously described scheme can be applied in a similar fashion to alleviate potential deadlock. As described, when a resource is allocated, a timed task will run to maintain the resource at the egress port. If communication is lost between an ingress and egress port, the egress port can always recover by timing out the task and releasing the resource to prevent a resource depletion situation.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

What is claimed is:

1. A method of writing data to a virtual target, comprising:
receiving a write command for a virtual target having at least first and second corresponding mirrored physical targets;
providing said write command to said first physical target and said second physical target;
determining whether a first transfer ready signal is returned by said first physical target and a second transfer ready signal is returned by said second physical target within a timeout period; and
providing an abort command to said first physical target and said second physical target only if said first transfer ready signal and said second transfer ready signal are not returned within said timeout period.

2. The method of claim 1, further comprising:
lowering a queue depth for said virtual target if said first transfer ready signal and said second transfer ready signal are not returned within said timeout period.

3. The method of claim 2, wherein:
said queue depth is a maximum number of commands that will be processed for said virtual target.

4. The method of claim 3, wherein:
said maximum number of commands is a maximum number of commands that will be processed for said virtual target by a storage switch.

5. The method of claim 3, wherein:
said maximum number of commands is a maximum number of commands that will be processed for said virtual target at a port of a storage switch.

6. The method of claim 2, wherein:
lowering said queue depth includes lowering said queue depth to a value of one.

7. The method of claim 2, further comprising:
determining whether a deadlock situation occurs within a period of time after lowering said queue depth; and
increasing said queue depth if said deadlock situation does not occur within said period of time.

8. The method of claim 7, wherein:
increasing said queue depth if said deadlock situation does not occur includes increasing said queue depth by a value of one.

9. The method of claim 7, wherein:
said period of time is 15 minutes.

10. The method of claim 2, further comprising:
again providing another write command to said first physical target and said second physical target if said first transfer ready signal and said second transfer ready signal are not returned within said timeout period.

11. The method of claim 1, wherein:
said timeout period is five seconds.

12. The method of claim 1, wherein said write command is a first write command, said method further comprising:
receiving a second write command; and
determining that said second write command exceeds a queue depth for said virtual target.

13. The method of claim 12, wherein said second write command is received from an initiator, said method further comprising:
providing a signal to said initiator to indicate that said second write command will not be processed.

14. The method of claim 12, further comprising:
maintaining said second write command in a process loop; and
determining whether said second write command exceeds said queue depth for said virtual target after a period of time.

15. The method of claim 12, further comprising:
queuing said second write command; and
dequeuing and providing said second write command to said first physical target and said second physical target when said second write command does not exceed said queue depth.

16. The method of claim 1, wherein:
said virtual target is a mirrored virtual target; and
data corresponding to said write command is to be synchronously routed to said first and second physical targets.

17. The method of claim 16, wherein:
said mirrored virtual target is a mirrored virtual logical unit.

18. The method of claim 1, wherein:
said first and second physical targets are first and second physical devices.

19. The method of claim 1, wherein:
said first and second physical targets are first and second physical logical units.

20. A storage switch, comprising:
at least one port adapted to receive a write command, said write command is for a virtual target having at least first and second corresponding mirrored physical targets, said at least one port is further adapted to provide said write command to said first and second physical targets;
at least one processing unit in communication with said at least one port, said at least one processing unit provides an abort command to said first physical target and said second physical target only if, within a timeout period after said write command is provided to said first physical target and said second physical target, a first transfer ready signal is not received from said first physical target and a second transfer ready signal is not received from said second physical target.

21. The storage switch of claim 20, wherein:
said at least one processing unit lowers a queue depth for said virtual target if, within said timeout period, said first transfer ready signal is not received from said first physical target and said second transfer ready signal is not received from said second physical target.

22. The storage switch of claim 21, wherein:
said queue depth is a maximum number of commands that will be processed for said virtual target.

23. The storage switch of claim 22, wherein:
said maximum number of commands is a maximum number of commands that will be processed for said virtual target by said storage switch.

24. The storage switch of claim 22, wherein:
said maximum number of commands is a maximum number of commands received at said at least one port that will be processed for said virtual target.

25. The storage switch of claim 21, wherein:
said at least one processing unit lowers said queue depth to a value of one.

26. The storage switch of claim 21, wherein:
said at least one processing unit increases said queue depth, after lowering said queue depth, if a deadlock situation is not detected by said storage switch within a period of time after lowering said queue depth.

27. The storage switch of claim 26, wherein:
said at least one processing unit increases said queue depth by a value of one.

28. The storage switch of claim 26, wherein:
said period of time is 15 minutes.

29. The storage switch of claim 20, wherein:
said at least one port includes an ingress port and at least one egress port, said storage switch receives said write command at said ingress port from an initiator, said write command is received at said at least one egress port from said ingress port and is provided to said first physical target and said second physical target via said at least one egress port.

30. The storage switch of claim 29, wherein said at least one processing unit includes:
a first processing unit in communication with said ingress port, said first processing unit provides said write command to said at least one egress port; and
at least one second processing unit in communication with said at least one egress port, said at least one second processing unit receives said write command from said first processing unit and provides said write command to said first physical target and said second physical target via said at least one egress port.

31. The storage switch of claim 30, wherein:
said first processing unit provides said abort command to said at least one second processing unit if a first transfer ready signal is not received from said first physical target and a second transfer ready signal is not received from said second physical target within said timeout period; and
said at least one second processing unit provides said abort command to said first physical target and said second physical target.

32. The storage switch of claim 30, wherein:
said at least one egress port includes a first and second egress port, said first egress port is coupled with said first physical target, said second egress port is coupled with said second physical target; and
said at least one second processing unit includes a second processing unit and a third processing unit, said second processing unit is in communication with said first egress port and said third processing unit is in communication with said second egress port.

33. The storage switch of claim 30, wherein:
said virtual target has said first corresponding physical target, said second corresponding physical target, and a third corresponding physical target;
said at least one egress port includes a first egress port, a second egress port, and a third egress port, said first egress port is coupled with said first physical target, said second egress port is coupled with said second physical target, said third egress port is coupled with said third physical target; and said at least one second processing unit includes a second processing unit, a third processing unit, and a fourth processing unit, said second processing unit is in communication with said first egress port, said third processing unit is in communication with said second egress port, and said fourth processing unit is in communication with said third egress port.

34. The storage switch of claim 20, wherein:

said at least one port again provides another write command to said first physical target and said second physical target if said first transfer ready signal and said second transfer ready signal are not returned within said timeout period.

35. The storage switch of claim 20, wherein:

said virtual target is a mirrored virtual target; and data associated with said write command is to be synchronously routed to said first physical target and said second physical target.

36. The storage switch of claim 35, wherein:

said mirrored virtual target is a mirrored virtual logical unit.

37. The storage switch of claim 20, wherein:

said first and second physical targets are first and second physical logical units.

38. The storage switch of claim 20, wherein:

said first and second physical targets are first and second physical storage devices.

39. The storage switch of claim 20, wherein:

said timeout period is five seconds.

40. One or more processor readable storage devices for storing processor readable code, said processor readable code for programming one or more processors to perform a method comprising the steps of:

receiving a write command for a virtual target having at least a first and a second corresponding mirrored physical targets;

providing said write command to said first physical target and said second physical target;

determining whether a first transfer ready signal is returned by said first physical target and a second transfer ready signal is returned by said second physical target within a timeout period; and providing an abort command to said first physical target and said second physical target only if said first transfer ready signal and said second transfer ready signal are not returned within said timeout period.

41. A storage switch comprising:

means for receiving a write command for a virtual target having at least first and second corresponding mirrored physical targets;

means for providing said write command to said first physical target and said second physical target;

means for determining whether a first transfer ready signal is returned by said first physical target and a second transfer ready signal is returned by said second physical target within a timeout period; and means for providing an abort command to said first physical target and said second physical target only if said first transfer ready signal and said second transfer ready signal are not returned within said timeout period.

* * * * *